(12) United States Patent
Hagihara

(10) Patent No.: US 8,957,953 B2
(45) Date of Patent: Feb. 17, 2015

(54) IMAGING DEVICE AND ENDOSCOPIC DEVICE

(71) Applicant: Olympus Corporation, Tokyo (JP)

(72) Inventor: Yoshio Hagihara, Tokyo (JP)

(73) Assignee: Olympus Corporation, Tokyo (JP)

( * ) Notice: Subject to any disclaimer, the term of this patent is extended or adjusted under 35 U.S.C. 154(b) by 336 days.

(21) Appl. No.: 13/650,589

(22) Filed: Oct. 12, 2012

(65) Prior Publication Data

US 2013/0093868 A1 Apr. 18, 2013

(30) Foreign Application Priority Data

Oct. 14, 2011 (JP) ................................ 2011-226757

(51) Int. Cl.
| | | |
|---|---|---|
| *H04N 5/335* | (2011.01) | |
| *H04N 7/18* | (2006.01) | |
| *G02B 23/24* | (2006.01) | |
| *H04N 5/3745* | (2011.01) | |
| *H04N 5/378* | (2011.01) | |
| *H04N 5/225* | (2006.01) | |

(52) U.S. Cl.
CPC .......... *G02B 23/2484* (2013.01); *H04N 5/3745* (2013.01); *H04N 5/378* (2013.01); *H04N 5/37457* (2013.01); *H04N 2005/2255* (2013.01)
USPC ............................................ 348/76; 348/308

(58) Field of Classification Search
None
See application file for complete search history.

(56) References Cited

U.S. PATENT DOCUMENTS

| | | | | |
|---|---|---|---|---|
| 6,963,362 | B1* | 11/2005 | Nakayama | ................ 348/224.1 |
| 7,561,197 | B2* | 7/2009 | Brissot | ......................... 348/308 |
| 2002/0097331 | A1* | 7/2002 | Yamada et al. | ............... 348/321 |
| 2004/0031905 | A1* | 2/2004 | Chan et al. | ................. 250/208.1 |
| 2007/0024726 | A1* | 2/2007 | Nomoto et al. | ............... 348/308 |

FOREIGN PATENT DOCUMENTS

| | | |
|---|---|---|
| JP | 2000-004399 A | 1/2000 |
| JP | 2001-008109 A | 1/2001 |

\* cited by examiner

*Primary Examiner* — Andy Rao
*Assistant Examiner* — Tyler Edwards
(74) *Attorney, Agent, or Firm* — Westerman, Hattori, Daniels & Adrian, LLP

(57) ABSTRACT

An imaging device and an endoscopic device can be further miniaturized. A vertical selection unit simultaneously resets charge accumulation units of a plurality of pixels, and then a horizontal selection unit sequentially selects a plurality of first pixel signals corresponding to voltages of the charge accumulation units of the plurality of pixels and inputs the first pixel signals to an output unit. Further, a vertical selection unit simultaneously transfers the signal charges generated by the charge generation units in the plurality of pixels to the charge accumulation units, and then a horizontal selection unit sequentially selects a plurality of second pixel signals corresponding to the voltages of the charge accumulation units of the plurality of pixels and inputs the second pixel signals to the output unit.

4 Claims, 19 Drawing Sheets

FIG. 19

| PIXEL CONFIGURATION | CONFIGURATION OF FIG.15 | CONFIGURATION OF FIG.17 |
|---|---|---|
| TRANSFER TRANSISTOR Tx | 4 | 4 |
| CONTROL TRANSISTOR Cnt | - | 4 |
| RESET TRANSISTOR Rst | 1 | 1 |
| AMPLIFICATION TRANSISTOR Drv | 1 | 1 |
| SELECTION TRANSISTOR Sel | 1 | 1 |
| TOTAL | 7 (1.75/pixel) | 11 (2.75/pixel) |

IMAGING DEVICE AND ENDOSCOPIC DEVICE

BACKGROUND OF THE INVENTION

1. Field of the Invention

The present invention relates to an imaging device and an endoscopic device using the same.

This application claims the benefits of Japanese Patent Application No. 2011-226757, filed Oct. 14, 2011, the disclosure of which is hereby incorporated herein by references in its entirety.

2. Description of Related Art

For imaging devices, various types of imaging devices, such as a MOS (Metal Oxide Semiconductor) type and a CCD (Charge Coupled Device) type, have been proposed and have led to practical use. Further, among the MOS types, there is a (C)MOS-type imaging device including pixels having an amplification type solid-state imaging element (APS: Active Pixel Sensor) configuration that amplifies and outputs a pixel signal corresponding to signal charges generated by a charge generation unit.

First, a configuration of a (C)MOS-type imaging device according to a first conventional example (e.g., see Japanese Patent Unexamined Application, First Publication No. 2000-4399) will be described. FIG. 15 shows a schematic configuration of the (C)MOS-type imaging device according to the first conventional example. An imaging device 1001a shown in FIG. 15 includes an imaging unit 1002, a vertical selection unit 1004, a column circuit unit 1005, a horizontal selection unit 1006, and an output unit 1007.

In the imaging unit 1002, a plurality of pixels 1003 including a charge generation unit PD (e.g., a photodiode), a transfer transistor Tx, a charge accumulation unit FD (e.g., floating diffusion), a reset transistor Rst, an amplification transistor Drv, and a selection transistor Sel are arranged in a matrix shape. In the example of FIG. 15, the imaging unit 1002 includes pixels 1003 (M11, M12, M21 and M22) arranged in two rows and two columns.

The charge generation unit PD generates signal charges corresponding to an amount of an incident electromagnetic wave. The transfer transistor Tx transfers the signal charges generated by the charge generation unit PD to a charge accumulation unit FD. The charge accumulation unit FD accumulates the transferred signal charges. The reset transistor Rst resets the charge accumulation unit FD to a predetermined voltage. The amplification transistor Drv amplifies a signal corresponding to a voltage of the charge accumulation unit FD and generates a pixel signal. The selection transistor Sel outputs the pixel signal to a vertical signal line 1030 arranged in each column of the imaging unit 1002. As is well known, a reset level and a signal level are output as the pixel signal from the pixel 1003.

The transfer transistor Tx is controlled by a transfer pulse output from the vertical selection unit 1004.

In FIG. 15, it is assumed that a transfer pulse output to the pixels 1003 (M11 and M12) of a first row is φTx_1 and a transfer pulse output to the pixels 1003 (M21 and M22) of the second row is φTx_2. The reset transistor Rst is controlled by a reset pulse output from the vertical selection unit 1004. In FIG. 15, it is assumed that a reset pulse output to the pixels 1003 (M11 and M12) of the first row is φRst_1, and a reset pulse output to the pixels 1003 (M21 and M22) of the second row is φRst_2. The selection transistor Sel is controlled by a selection pulse output from the vertical selection unit 1004. In FIG. 15, it is assumed that the selection pulse output to the pixels 1003 (M11 and M12) of the first row is φSel_1, and the selection pulse output to the pixels 1003 (M21 and M22) of the second row is φSel_2.

The vertical selection unit 1004 selects the plurality of pixels 1003 arranged in a row direction of the imaging unit 1002, and controls an operation of the selected pixels 1003. The column circuit unit 1005 is arranged in each column and connected to the vertical signal line 1030. The column circuit unit 1005 includes a load transistor SW1, switch transistors SW2, SW3, SW4, and SW5, and capacitive elements CR and CS. The pixel signals at the reset level and the signal level are held in the capacitive elements CR and CS, respectively.

The load transistor SW1 is biased by a bias voltage LMB. The switch transistors SW2 and SW3 are controlled by control pulses φSHR and φSHS, respectively, and turned on when the pixel signals at the reset level and the pixel signal at the signal level are transferred. The switch transistors SW4 and SW5 are controlled for each column. The switch transistor SW4 is connected to a horizontal signal line 1031 connected to the output unit 1007, and the switch transistor SW5 is connected to a horizontal signal line 1032 connected to the output unit 1007.

The switch transistors SW4 and SW5 of the first column are controlled by a selection pulse HSR[0] output from the horizontal selection unit 1006, and turned on when the pixel signal at the reset level and the pixel signal at the signal level held in the capacitive elements CR and CS of the first column are transferred. The switch transistors SW4 and SW5 of the second column are controlled by a selection pulse HSR[1] output from the horizontal selection unit 1006, and turned on when the pixel signal at the reset level and the pixel signal at the signal level held in the capacitive elements CR and CS of the second column are transferred. The horizontal selection unit 1006 sequentially selects the switch transistors SW4 and SW5 using the selection pulses HSR[0] and HSR[1] and transfers the pixel signals held in the capacitive elements CR and CS to the output unit 1007. The output unit 1007 outputs the transferred pixel signal to a circuit of a subsequent stage.

Next, an operation of the (C)MOS-type imaging device according to the first conventional example will be described. FIG. 16 shows an operation of the (C)MOS-type imaging device according to the first conventional example. First, as the selection pulse φSel_1 output to the pixel 1003 of the first row is changed from being in an L (Low) state to being in an H (High) state, the selection transistor Sel is turned ON (a conduction state) and the pixel 1003 of the first row is selected. At substantially the same time, as the reset pulse φRst_1 output to the pixel 1003 of the first row is changed from the L state to the H state, the reset transistor Rst is turned ON, the charge accumulation unit FD is reset, and the pixel signal at the reset level is output to the vertical signal line 1030.

Then, as the reset pulse φRst_1 is changed from being in the H state to being in the L state, the reset transistor Rst is turned OFF (a non-conduction state). At substantially the same time, the control pulse φSHR output to the switch transistor SW2 is changed from being in the L state to being in the H state, the switch transistor SW2 is turned ON, and the pixel signal at the reset level of the pixels 1003 (M11 and M12) of the first row is held in the capacitive element CR.

Then, as the control pulse φSHR is changed from being in the H state to being in the L state, the switch transistor SW2 is turned OFF. At substantially the same time, as the transfer pulse φTx_1 output to the pixel 1003 of the first row is changed from being in the L state to being in the H state, the transfer transistor Tx is turned ON, the signal charges of the charge generation unit PD are transferred to the charge accumulation unit FD, and the pixel signal at the signal level is output to the vertical signal line 1030.

Then, as the transfer pulse φTX_1 is changed from being in the H state to being in the L state, the transfer transistor Tx is turned OFF. At substantially the same time, as the control pulse φSHS output to the switch transistor SW3 is changed from being in the L state to being in the H state, the switch transistor SW3 is turned ON, and the pixel signal at the signal level output from the pixels 1003 (M11 and M12) of the first row is held in the capacitive element CS.

Then, as the control pulse φSHS is changed from being in the H state to being in the L state, the switch transistor SW3 is turned OFF, and as the selection pulse φSel_1 output to the pixel 1003 of the first row is changed from being in the H state to being in the L state, the selection transistor Sel is turned OFF. At substantially the same time, as the selection pulse HSR[0] output to the switch transistors SW4 and SW5 of the first column is changed from being in the L state to being in the H state, the switch transistors SW4 and SW5 are turned ON, the pixel signal at the reset level held in the capacitive element CR of the pixel 1003 (M11) of the first row and the first column is output to the horizontal signal line 1031, and the pixel signal at the signal level held in the capacitive element CS of the pixel 1003 (M11) of the first row and the first column is output to the horizontal signal line 1032. The pixel signals at the reset level and the signal level are input to the output unit 1007, and, for example, a signal corresponding to a difference between the reset level and the signal level is output from the output unit 1007.

Then, as the selection pulse HSR[0] is changed from being in the H state to being in the L state, the switch transistors SW4 and SW5 are turned OFF. At substantially the same time, as the selection pulse HSR[1] output to the switch transistors SW4 and SW5 of the second column is changed from being in the L state to being in the H state, the switch transistors SW4 and SW5 are turned ON. The pixel signal at the reset level of the pixel 1003 (M12) of the first row and the second column held in the capacitive element CR is output to the horizontal signal line 1031, and the pixel signal at the signal level of the pixel 1003 (M12) of the first row and the second column held in the capacitive element CS is output to the horizontal signal line 1032. The pixel signals at the reset level and the signal level are input to the output unit 1007, and, for example, a signal corresponding to a difference between the reset level and the signal level is output from the output unit 1007.

Then, as the selection pulse HSR[1] is changed from being in the H state to being in the L state, the switch transistors SW4 and SW5 are turned OFF and an operation of reading the pixel signal from the pixel 1003 of the first row ends. An operation of reading a pixel signal from the pixel 1003 of the second row is then performed, similar to the operation of reading the pixel signal from the pixels 1003 of the first row.

Next, a configuration of a (C)MOS-type imaging device according to a second conventional example (e.g., see Japanese Unexamined Patent Application, First Publication No. 2001-8109) will be described. FIG. 17 shows a schematic configuration of the (C)MOS-type imaging device according to the second conventional example.

An imaging device 1001b shown in FIG. 17 includes an imaging unit 1002, a vertical selection unit 1004, a switch unit 1008, a horizontal selection unit 1006, and an output unit 1009.

Configurations of the imaging unit 1002, the vertical selection unit 1004, and the horizontal selection unit 1006 are substantially similar to those in FIG. 15. However, in a pixel 1003, a control transistor Cnt_for controlling a transfer transistor Tx is added. The control transistor Cnt is controlled by a selection pulse output from the vertical selection unit 1004. Further, the transfer transistor Tx is controlled by a transfer pulse output from the horizontal selection unit 1006. A transfer pulse φCnt_1 is output from the horizontal selection unit 1006 to the transfer transistor Tx in the pixel 1003 of a first column, and a transfer pulse φCnt_2 is output from the horizontal selection unit 1006 to the transfer transistor Tx in the pixel 1003 of a second column.

The switch unit 1008 includes a switch transistor SW arranged in each column. The switch transistor SW is connected to a vertical signal line 1030 and a horizontal signal line 1031, and outputs a pixel signal output to the vertical signal line 1030, to the horizontal signal line 1031. The switch transistor SW of the first column is controlled by a selection pulse HSR[0] output from the horizontal selection unit 1006, and the switch transistor SW of the second column is controlled by a selection pulse HSR[1] output from the horizontal selection unit 1006. The horizontal signal line 1031 is connected to the output unit 1009. The horizontal selection unit 1006 sequentially selects the switch transistors SW using the selection pulses HSR[0] and HSR[1] to transfer the pixel signal to the output unit 1009. This pixel signal is input to the output unit 1009 as a current signal. The output unit 1009 converts the pixel signal to a voltage signal, and outputs the voltage signal to the circuit of the subsequent stage.

Next, an operation of the (C)MOS-type imaging device according to the second conventional example will be described. FIG. 18 shows an operation of the (C)MOS-type imaging device according to the second conventional example. First, as a selection pulse φSel_1 output to the pixel 1003 of the first row is changed from being in the L state to being in the H state, a selection transistor Sel and the control transistor Cnt are turned ON and the pixel 1003 of the first row is selected. At substantially the same time, as a reset pulse φRst_1 output to the pixel 1003 of the first row is changed from being in the L state to being in the H state, the reset transistor Rst is turned ON, a charge accumulation unit FD is reset, and the pixel signal at the reset level is output to the vertical signal line 1030. At substantially the same time, as the selection pulse HSR[0] output to the switch transistor SW of the first column is changed from being in the L state to being in the H state, the switch transistor SW is turned ON, the pixel signal at the reset level of the pixel 1003 (M11) of the first row and the first column output to the vertical signal line 1030 is output to the horizontal signal line 1031 and input to the output unit 1009. The output unit 1009 converts the pixel signal at the reset level input as a current signal into a voltage signal, and outputs the voltage signal to the circuit of the subsequent stage.

Then, as the reset pulse φRst_1 is changed from being in the H state to being in the L state, the reset transistor Rst is turned OFF. Then, as the control pulse φCnt_1 output to the transfer transistor Tx of the first column is changed from being in the L state to being in the H state, the transfer transistor Tx is turned ON, signal charges of the charge generation unit PD are transferred to the charge accumulation unit FD, and the pixel signal at the signal level is output to the vertical signal line 1030. Since the selection pulse HSR[0] output to the switch transistor SW of the first column is in an H state and the switch transistor SW is turned ON, the pixel signal at the signal level of the pixel 1003 (M11) of the first row and the first column output to the vertical signal line 1030 is output to the horizontal signal line 1031 and input to the output unit 1009. The output unit 1009 converts the pixel signal at the signal level input as a current signal into a voltage signal, and outputs the voltage signal to the circuit of the subsequent stage.

Then, as the transfer pulse φCnt_1 is changed from being in the H state to being in the L state, the transfer transistor Cnt is turned OFF. Then, as the selection pulse HSR[0] is changed from being in the H state to being in the L state, the switch transistor SW is turned OFF and the operation of reading the pixel signal from the pixel 1003 of the first row and the first column ends.

The operation of reading the pixel signal from the pixel 1003 (M12) of the first row and the second column is then performed. Since the operation of reading the pixel signal from the pixel 1003 of the first row and the second column is similar to the operation of reading the pixel signal from the pixel 1003 of the first row and the first column except that the switch transistor SW of the second column is selected by the transfer pulse HSR[1] instead of the transfer pulse HSR[0], a description thereof will be omitted. As the selection pulse φSel_1 is changed from being in the H state to being in the L state, the selection transistor Sel and the control transistor Cnt_are turned OFF and the operation of reading a pixel signal from the pixel 1003 of the first row ends. An operation of reading a pixel signal from the pixel 1003 of the second row is then performed. Since an operation of reading a pixel signal from the pixel 1003 of the second row is similar to the operation of reading a pixel signal from the pixel 1003 of the first row except that the pixel 1003 of the second row is selected by the selection pulse φSel_2 instead of the selection pulse φSel_1, a description thereof will be omitted. Lastly, the circuit of the subsequent stage acquires a signal component (a signal corresponding to a difference between the reset level and the signal level) by performing subtraction (a CDS process).

SUMMARY OF THE INVENTION

A first embodiment of the present invention is an imaging device including: an imaging unit in which a plurality of pixels is arranged in a matrix shape, each of the pixels including at least one unit cell unit including a charge generation unit for generating signal charges corresponding to a size of an incident electromagnetic wave and a charge transfer unit for transferring the signal charges generated by the charge generation unit, a charge accumulation unit for accumulating the signal charges transferred by the charge transfer unit, a reset unit for resetting the charge accumulation unit, and a signal generation unit for generating a pixel signal corresponding to a voltage of the charge accumulation unit; a first selection unit for selecting a plurality of pixels arranged in a row direction of the imaging unit and controlling an operation of the plurality of selected pixels; a second selection unit for sequentially selecting a plurality of the pixel signals output from the plurality of selected pixels selected by the first selection unit; and an output unit for outputting an input signal to a circuit of a subsequent stage. In the plurality of pixels arranged in the row direction, the first selection unit simultaneously resets the charge accumulation units of the plurality of pixels, and then the second selection unit sequentially selects a plurality of first pixel signals corresponding to voltages of the charge accumulation units of the plurality of pixels and inputs the first pixel signals to the output unit, and the first selection unit simultaneously transfers the signal charges generated by the charge generation units in the plurality of pixels to the charge accumulation units, and then the second selection unit sequentially selects a plurality of second pixel signals corresponding to the voltages of the charge accumulation units of the plurality of pixels and inputs the second pixel signals to the output unit.

Further, according to a second embodiment the present invention, in the imaging device according to the first embodiment, the first pixel signal and the second pixel signal are output in the row direction of the imaging unit.

Further, according to a third embodiment of the present invention, in the imaging device according to the first or second embodiment, the output unit converts a current value of an input signal into a voltage value.

Further, a fourth embodiment of the present invention is an endoscopic device including an imaging device according to any one of the first to third embodiments.

BRIEF DESCRIPTION OF THE DRAWINGS

FIG. 19 is a reference diagram showing the number of transistors included in a shared pixel in the first conventional example and the second conventional example.

DETAILED DESCRIPTION OF THE INVENTION

Hereinafter, embodiments of the present invention will be described with reference to the drawings.

(First Embodiment)

Figure 1:
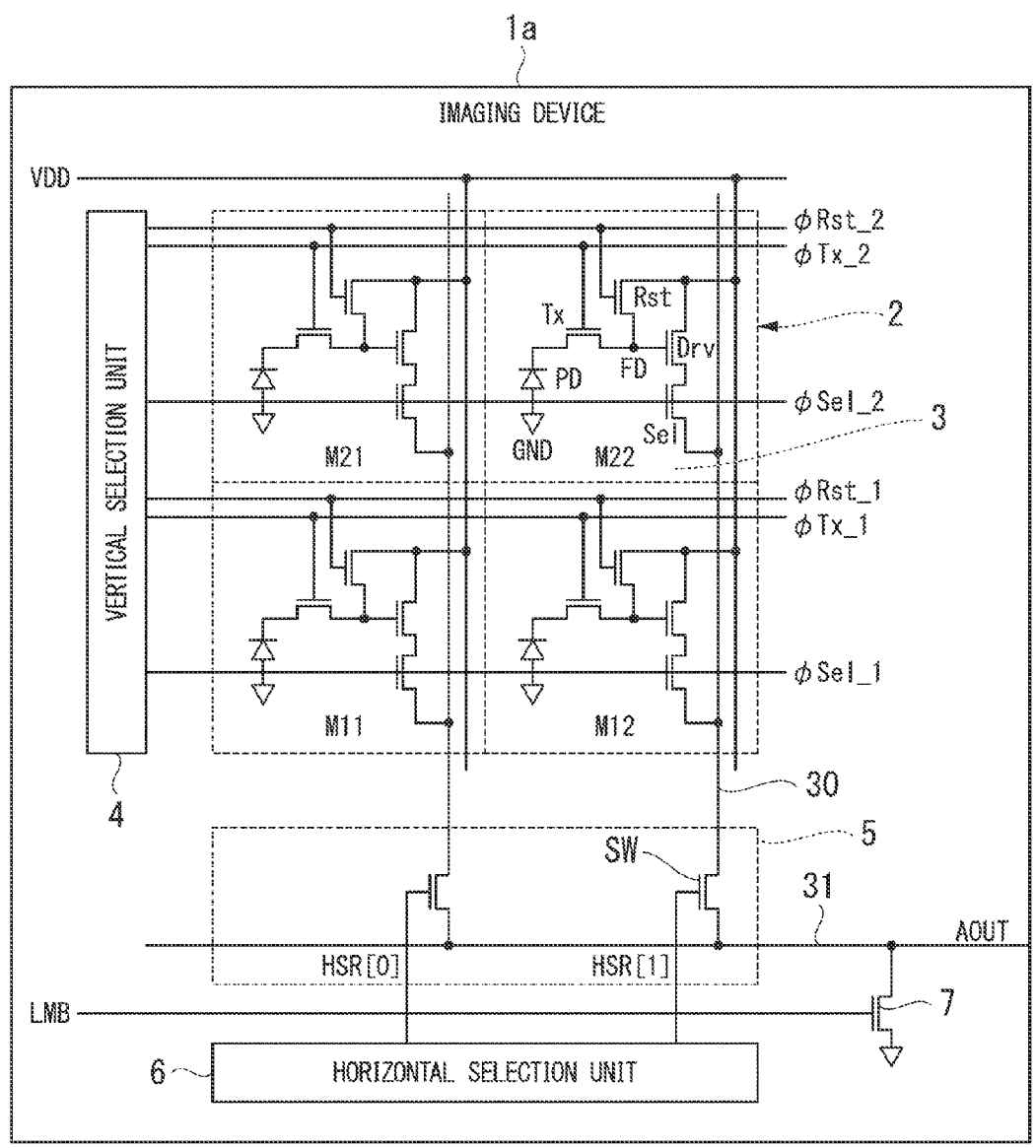
FIG. 1 is a configuration diagram showing a configuration of an imaging device according to a first embodiment of the present invention.

First, a first embodiment of the present invention will be described. FIG. 1 shows a configuration of an imaging device according to the present embodiment. Hereinafter, a configuration of the present example will be described. The imaging device 1a shown in FIG. 1 includes an imaging unit 2, a vertical selection unit 4 (a first selection unit), a switch unit 5, a horizontal selection unit 6 (a second selection unit), and an output unit 7.

In the imaging unit 2, a plurality of pixels 3 each including a charge generation unit PD (e.g., a photodiode), a transfer transistor Tx, a charge accumulation unit FD (e.g., floating diffusion), a reset transistor Rst, an amplification transistor Drv, and a selection transistor Sel are arranged in a matrix shape. In the example FIG. 1, the imaging unit 2 includes pixels 3 (M11, M12, M21 and M22) arranged in two rows and two columns.

The charge generation unit PD generates signal charges corresponding to an amount of an incident electromagnetic wave. The transfer transistor Tx transfers the signal charges generated by the charge generation unit PD to the charge accumulation unit FD. The unit cell unit includes a charge generation unit PD and a transfer transistor Tx. The charge accumulation unit FD accumulates the transferred signal charges. The reset transistor Rst resets the charge accumulation unit FD to a predetermined voltage. The amplification transistor Drv amplifies a signal corresponding to a voltage of the charge accumulation unit FD to generate a pixel signal. The selection transistor Sel outputs the pixel signal to a vertical signal line 30 arranged in each column of the imaging unit 2. As is well known, a reset level and a signal level are output as a pixel signal from the pixel 3.

A terminal of the charge generation unit PD is connected to ground GND and the other terminal is connected to the transfer transistor Tx. The transfer transistor Tx includes, for example, an NMOS transistor having a drain terminal connected to the other terminal of the charge generation unit PD, a source terminal connected to the charge accumulation unit FD, and a gate terminal connected to a control signal line extending in the row direction from the vertical selection unit 4. The reset transistor Rst includes, for example, an NMOS transistor having a drain terminal connected to a power supply line that supplies a power supply voltage VDD, a source terminal connected to the charge accumulation unit FD, and a gate terminal connected to a control signal line extending in the row direction from the vertical selection unit 4.

The amplification transistor Drv includes, for example, an NMOS transistor having a drain terminal connected to the power supply line that supplies the power supply voltage VDD, a source terminal connected to the selection transistor Sel, and a gate terminal connected to the charge accumulation unit FD. The selection transistor Sel includes, for example, an NMOS transistor having a drain terminal connected to the amplification transistor Drv, a source terminal connected to the vertical signal line 30, and a gate terminal connected to a control signal line extending in the row direction from the vertical selection unit 4.

The transfer transistor Tx is controlled by a transfer pulse output from the vertical selection unit 4. In FIG. 1, it is assumed that the transfer pulse output to the pixels 3 (M11 and M12) of a first row is φTx_1, and the transfer pulse output to the pixels 3 (M21 and M22) of a second row is φTx_2. The reset transistor Rst is controlled by a reset pulse output from the vertical selection unit 4. In FIG. 1, it is assumed that the reset pulse output to the pixels 3 (M11 and M12) of the first row is φRst_1, and the reset pulse output to the pixels 3 (M21 and M22) of the second row is φRst_2. The selection transistor Sel is controlled by a selection pulse output from the vertical selection unit 4. In FIG. 1, it is assumed that the selection pulse output to the pixels 3 (M11 and M12) of the first row is φSel_1, and the selection pulse output to the pixels 3 (M21 and M22) of the second row is φSel_2.

The vertical selection unit 4 selects the plurality of pixels 3 arranged in a row direction of the imaging unit 2, and controls an operation of the selected pixel 3. The switch unit 5 includes a switch transistor SW arranged in each column.

The switch transistor SW is connected to the vertical signal line 30 and the horizontal signal line 31, and outputs the pixel signal output to the vertical signal line 30 to the horizontal signal line 31. The switch transistor SW includes, for example, an NMOS transistor having a drain terminal connected to the vertical signal line 30, a source terminal connected to the horizontal signal line 31, and a gate terminal connected to the control signal line extending in a column direction of the horizontal selection unit 6. The switch transistor SW of the first column is controlled by a selection pulse HSR[0] output from the horizontal selection unit 6, and the switch transistor SW of the second column is controlled by a selection pulse HSR[1] output from the horizontal selection unit 6. The horizontal signal line 31 is connected to the output unit 7.

The horizontal selection unit 6 sequentially selects the switch transistors SW using the selection pulses HSR[0] and HSR[1], and transfers the pixel signal to the output unit 7. The pixel signal is input as a current signal to the output unit 7. The output unit 7 converts the pixel signal to a voltage signal, and outputs the voltage signal to the circuit of the subsequent stage. The output unit 7 includes an NMOS transistor having, for example, a drain terminal connected to the horizontal signal line 31, a source terminal connected to ground, and a gate terminal connected to a bias voltage LMB. The output unit 7 is biased by a bias voltage LMB.

Figure 2:
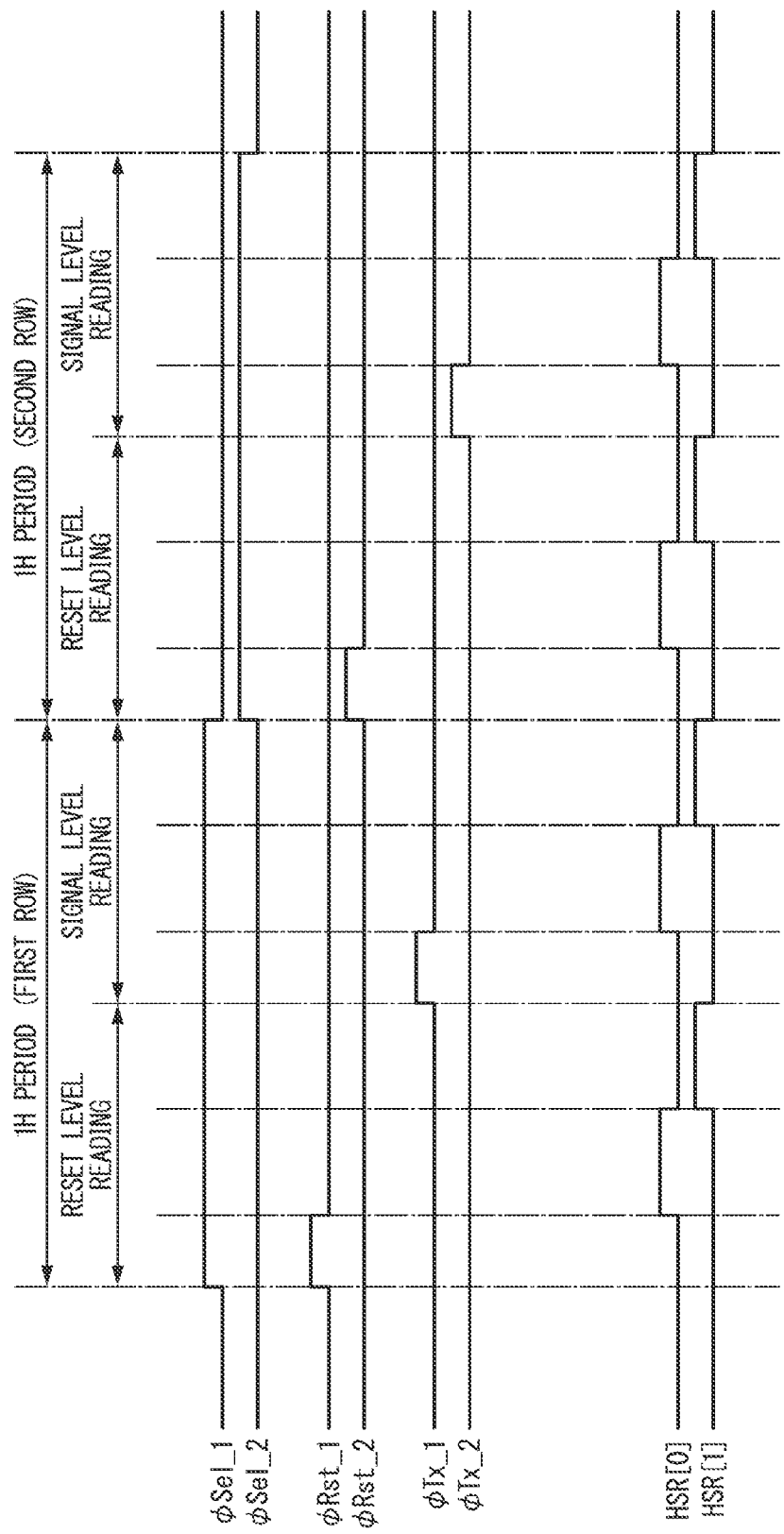
FIG. 2 is a timing chart showing an operation of the imaging device according to the first embodiment of the present invention.

Next, an operation of the imaging device according to the present embodiment will be described. FIG. 2 shows an operation of the imaging device according to the present embodiment. First, as the selection pulse φSel_1 output to the pixel 3 of the first row is changed from an L (Low) state to an H (High) state, the selection transistor Sel is turned ON (a conduction state) and the pixel 3 of the first row is selected. At substantially the same time, as the reset pulse φRst_1 output to the pixel 3 of the first row is changed from being in the L state to being in the H state, the reset transistor Rst is turned ON, the charge accumulation unit FD is reset, and the pixel signal at the reset level is output to the vertical signal line 30.

Then, as the reset pulse φRst_1 is changed from being in the H state to being in the L state, the reset transistor Rst is turned OFF (non-conduction state). At substantially the same time, as the selection pulse HSR[0] output to the switch transistor SW of the first column is changed from being in the L state to being in the H state, the switch transistor SW is turned ON. The pixel signal at the reset level of the pixel 3

(M11) of the first row and the first column output to the vertical signal line 30 is output to the horizontal signal line 31 and input to the output unit 7. The output unit 7 converts the pixel signal at the reset level input as a current signal into a voltage signal, and outputs the voltage signal to a circuit of a subsequent stage.

Then, as the selection pulse HSR[0] is changed from being in the H state to being in the L state, the switch transistor SW is turned OFF. At substantially the same time, as the selection pulse HSR[1] output to the switch transistor SW of the second column is changed from being in the L state to being in the H state, the switch transistor SW is turned ON. The pixel signal at the reset level of the pixel 3 (M12) of the first row and the second column output to the vertical signal line 30 is output to the horizontal signal line 31 and input to the output unit 7. The output unit 7 converts the pixel signal at the reset level input as a current signal into a voltage signal, and outputs the voltage signal to the circuit of the subsequent stage.

Then, as the selection pulse HSR[1] is changed from being in the H state to being in the L state, the switch transistor SW is turned OFF. At substantially the same time, as the transfer pulse φTx_1 output to the transfer transistor Tx of the first row is changed from being in the L state to being in the H state, the transfer transistor Tx is turned ON, the signal charges of the charge generation unit PD are transferred to the charge accumulation unit FD, and the pixel signal at the signal level is output to the vertical signal line 30.

Then, as the transfer pulse φTx_1 is changed from being in the H state to being in the L state, the transfer transistor Tx is turned OFF. At substantially the same time, since the selection pulse HSR[0] output to the switch transistor SW of the first column is changed from being in the L state to being in the H state, the switch transistor SW is turned ON and the pixel signal at the signal level of the pixel 3 (M11) of the first row and the first column output to the vertical signal line 30 is output to the horizontal signal line 31 and input to the output unit 7. The output unit 7 converts the pixel signal at the signal level input as a current signal into a voltage signal, and outputs the voltage signal to the circuit of the subsequent stage.

Then, as the selection pulse HSR[0] is changed from being in the H state to being in the L state, the switch transistor SW is turned OFF. At substantially the same time, as the selection pulse HSR[1] output to the switch transistor SW of the second column is changed from being in the L state to being in the H state, the switch transistor SW is turned ON and the pixel signal at the signal level of the pixel 3 (M12) of the first row and the second column output to the vertical signal line 30 is output to the horizontal signal line 31 and input to the output unit 7. The output unit 7 converts the pixel signal at the reset level input as a current signal into a voltage signal, and outputs the voltage signal to the circuit of the subsequent stage.

Then, as the selection pulse HSR[1] is changed from being in the H state to being in the L state, the switch transistor SW is turned OFF and the operation of reading the pixel signal from the pixel 3 of the first row ends.

Then, an operation of reading the pixel signal from the pixel 3 of the second row is performed. Since the operation of reading the pixel signal from the pixel 3 of the second row is the same as the operation of reading the pixel signal from the pixel 3 of the first row except that the pixel 3 of the second row is selected by the selection pulse φSel_2 instead of the selection pulse φSel_1, a description thereof will be omitted. Lastly, the circuit of the subsequent stage acquires a signal component (a signal corresponding to a difference between the reset level and the signal level) by performing subtraction (a CDS process).

Figure 3:
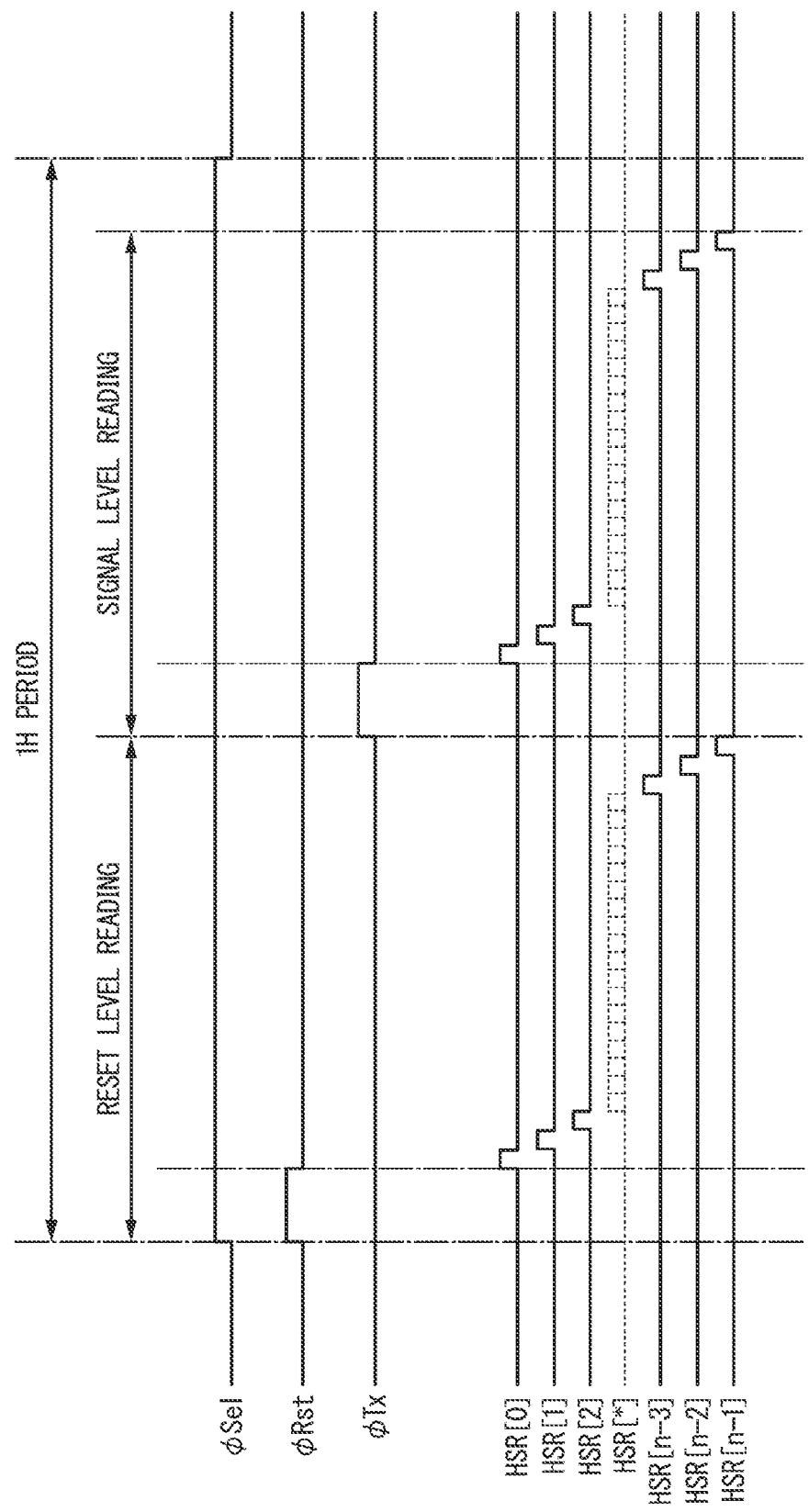
FIG. 3 is a timing chart showing an operation of the imaging device according to the first embodiment of the present invention.

While a total of four, 2×2, pixels 3 are arranged in the imaging device 1a shown in FIG. 1, the number of pixels 3 is not limited thereto. FIG. 3 shows an operation of the imaging device when an arrangement of the pixels 3 is an n×n (n is a natural number greater than or equal to 3) arrangement, which is more general. In FIG. 3, only an operation of reading the pixel signal from the pixel 3 corresponding to one row is shown. Hereinafter, an operation of the imaging device including pixels 3 having a more general arrangement will be described.

The selection transistor Sel is turned ON by the selection pulse φSel_to select the pixel 3 of a predetermined row, and the reset transistor Rst is turned ON by the reset pulse φRst_to reset the charge accumulation unit FD. Then, as the selection pulses φHSR[*] (* is 0 to n−1) output to the switch transistors SW of the respective columns are sequentially changed from being in the L state to being in the H state, the switch transistors SW of the respective columns are sequentially turned ON. Accordingly, the pixel signals at the reset level of the pixels 3 of the respective columns output to the vertical signal line 30 are sequentially output to the horizontal signal line 31 and input to the output unit 7. The output unit 7 converts the pixel signal at the reset level of the pixel 3 of each column input as a current signal into a voltage signal, and outputs the voltage signal to the circuit of the subsequent stage.

Then, the transfer transistor Tx is turned ON by the transfer pulse φTx to transfer the signal charges of the charge generation unit PD to the charge accumulation unit FD, and the pixel signal at the signal level is output to the vertical signal line 30. Then, as the selection pulses φHSR[*] (* is 0 to n−1) output to the switch transistors SW of the respective columns are sequentially changed from being in the L state to being in the H state, the switch transistors SW of the respective columns are sequentially turned ON. Accordingly, the pixel signals at the signal level of the pixels 3 of the respective columns output to the vertical signal line 30 are sequentially output to the horizontal signal line 31 and input to the output unit 7. The output unit 7 converts the pixel signal at the signal level of the pixel 3 of each column input as a current signal into a voltage signal, and outputs the voltage signal to the circuit of the subsequent stage. Then, the circuit of the subsequent stage acquires a signal component (a signal corresponding to a difference between the reset level and the signal level) by performing subtraction (a CDS process).

Figure 15:
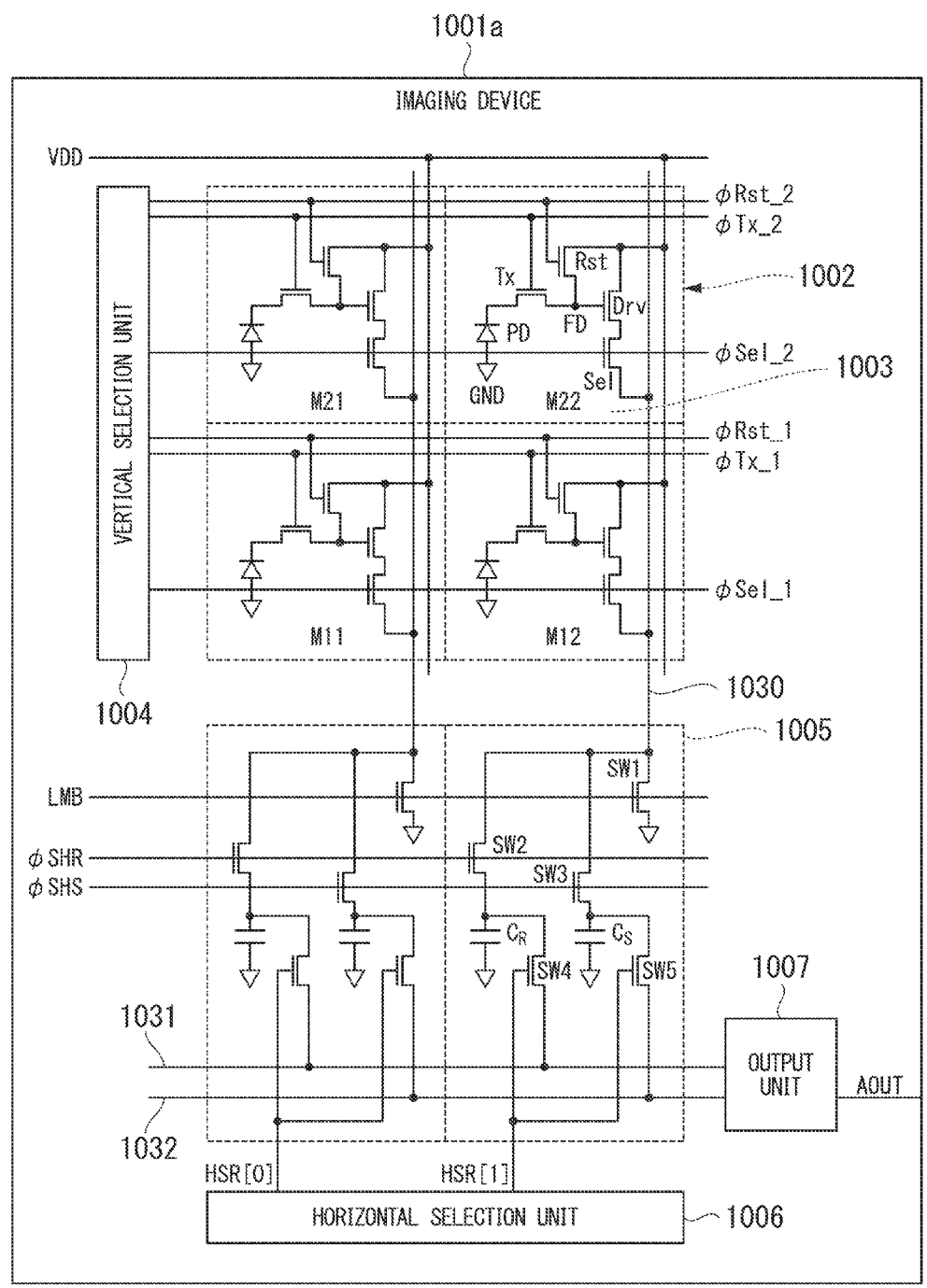
FIG. 15 is a configuration diagram showing a configuration of an imaging device according to a first conventional example.
Figure 16:
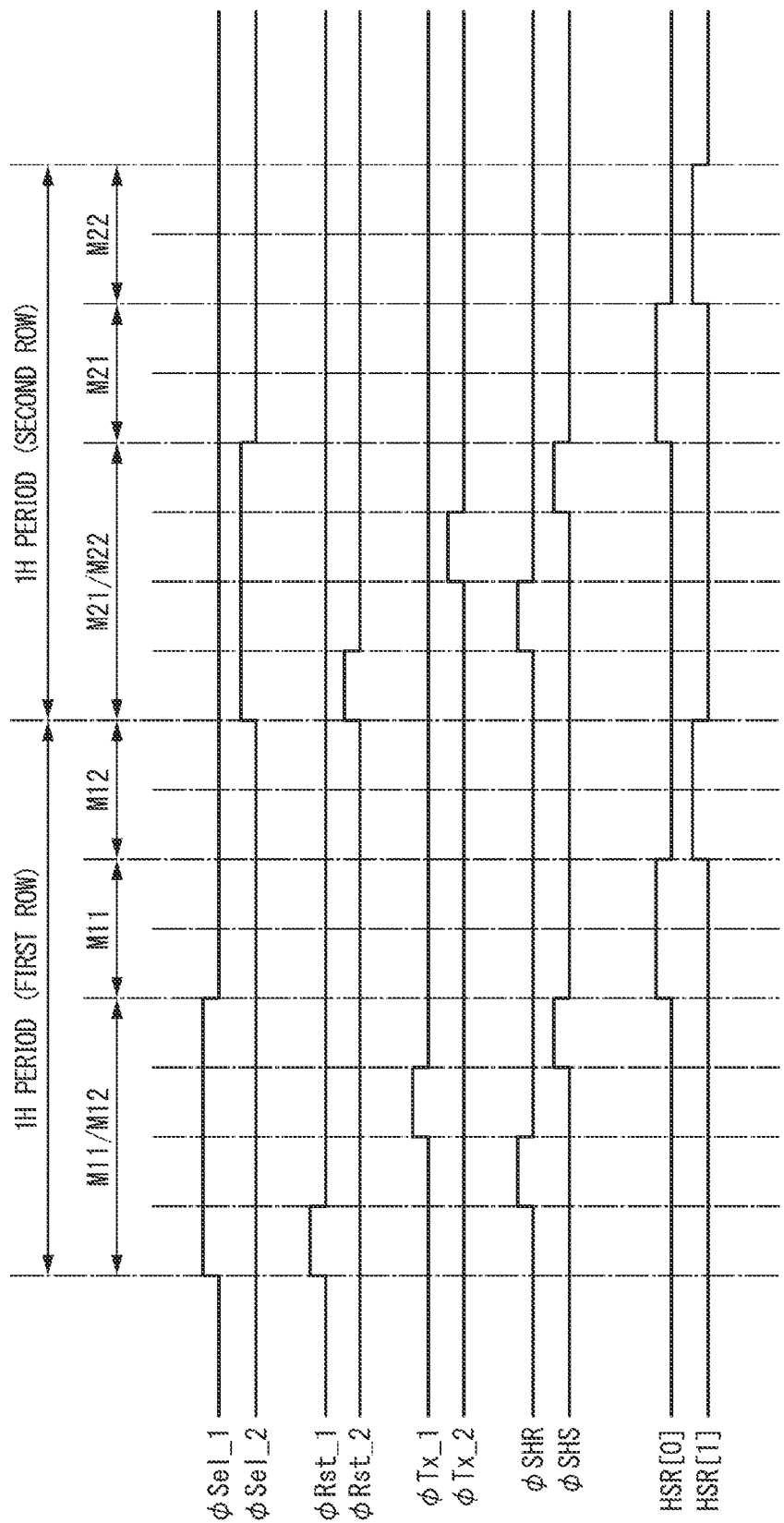
FIG. 16 is a timing chart showing an operation of the imaging device according to the first conventional example.

In the imaging device 1001a shown in FIG. 15, since output unit 1007 obtains a difference between the pixel signal at the reset level and the pixel signal at the signal level, the pixel signal at the reset level and the pixel signal at the signal level read at different timings are first held in the capacitive elements CR and CS, and then output to the output unit 1007 at the same timing. On the other hand, in the imaging device 1a of the present embodiment, since a process of obtaining the difference between the pixel signal at the reset level and the pixel signal at the signal level is performed in the circuit of the subsequent stage of the output unit 7, it is unnecessary to hold the pixel signal at the reset level and the pixel signal at the signal level in a column part corresponding to each column of the imaging unit 2. Accordingly, in the imaging device 1a of the present embodiment, a capacitive element that holds the pixel signal at the reset level and the pixel signal at the signal level becomes unnecessary, and the imaging device 1a may be miniaturized as compared to the imaging device 1001a shown in FIG. 15.

Figure 17:
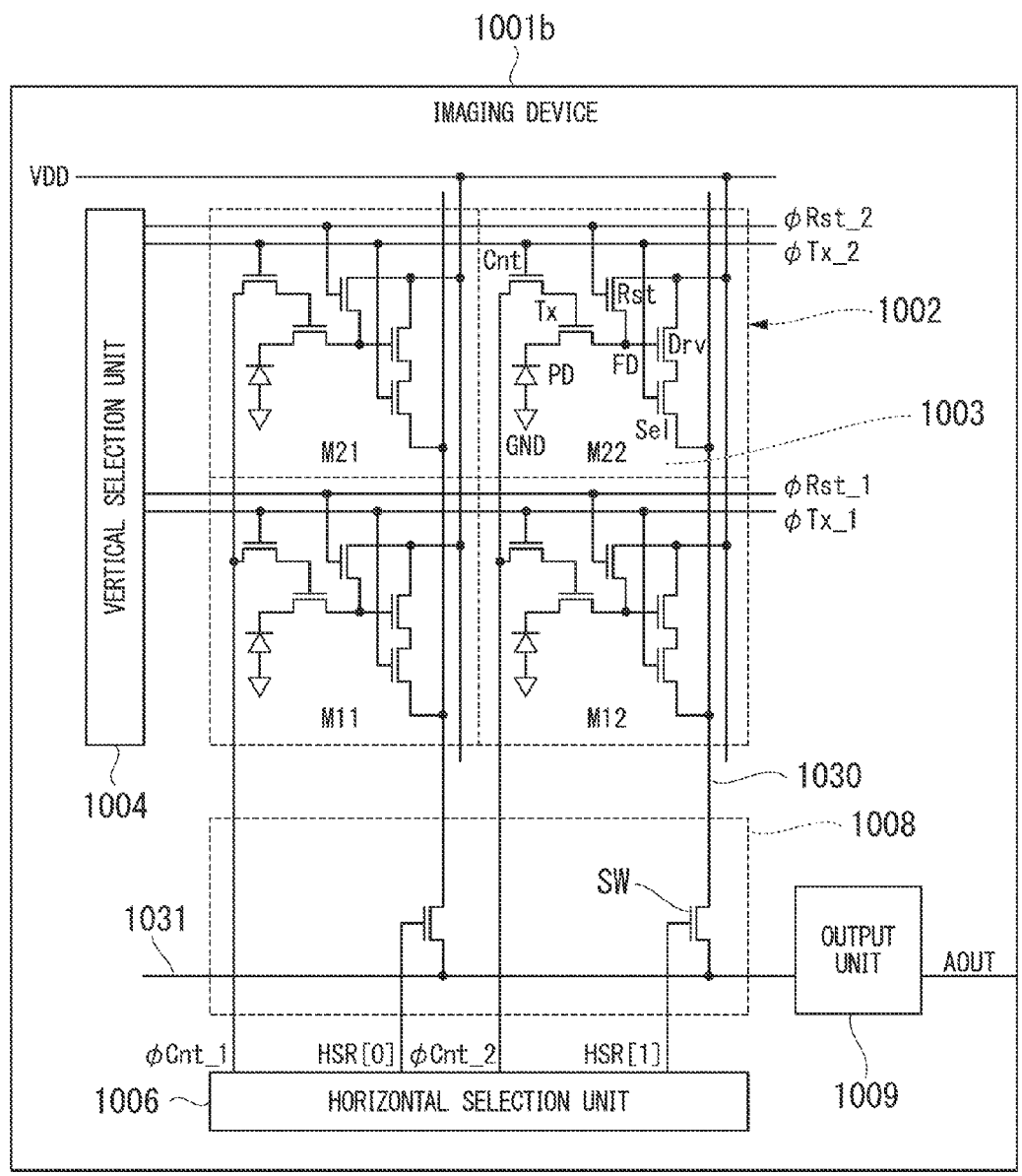
FIG. 17 is a configuration diagram showing a configuration of an imaging device according to a second conventional example.
Figure 18:
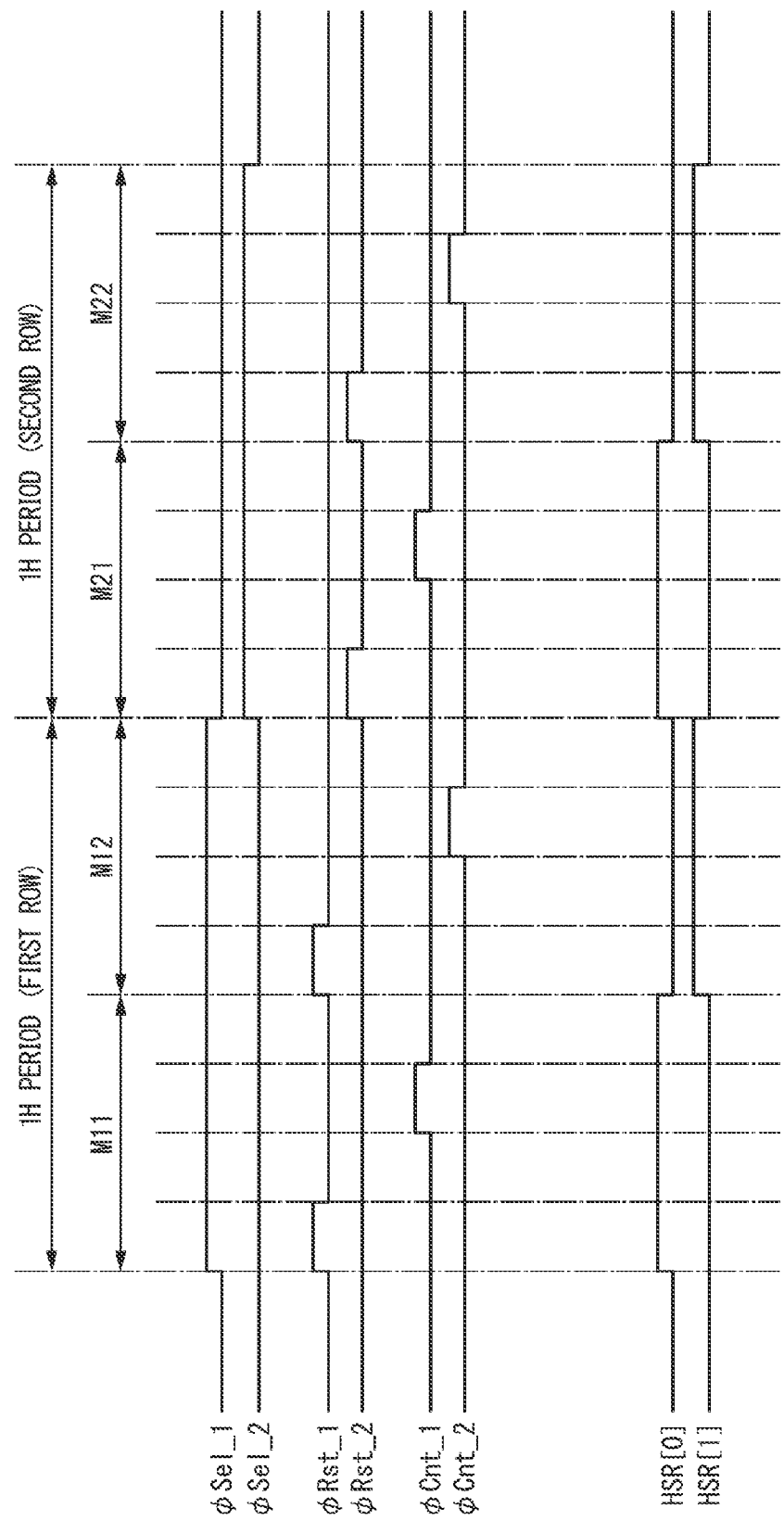
FIG. 18 is a timing chart showing an operation of the imaging device according to the second conventional example.

In the imaging device 1001b shown in FIG. 17, as shown in FIG. 18, the switch transistors SW are sequentially selected for each column by the selection pulse HSR in a state in which the pixel 1003 of a predetermined row is selected by the selection pulse φSel, and the pixel signal at the reset level and the pixel signal at the signal level are read in a corresponding period of time for each column. Further, the signal charges of the charge generation unit PD are transferred to the charge accumulation unit FD in a corresponding period of time for each column. Thus, in the imaging device 1001b shown in FIG. 17, since the transfer of signal charges of the charge generation unit PD of each column is performed in the corresponding period of time for each column, the control transistor Cnt_for controlling the transfer transistor Tx for each column may be necessary.

On the other hand, in the imaging device 1a of the present embodiment, as shown in FIG. 2, after the charge accumulation units FD of a predetermined row are simultaneously reset in a state in which the pixels 3 of the predetermined row are selected by the selection pulse φSel. The switch transistors SW of the respective columns are sequentially selected by the selection pulse HSR, and the pixel signals at the reset level of the respective columns are sequentially read. Further, after the signal charges of the charge generation units PD of the predetermined row are simultaneously transferred to the charge accumulation units FD in a state in which the pixels 3 of the predetermined row are selected by the selection pulse φSel, the switch transistors SW of the respective columns are sequentially selected by the selection pulse HSR and the pixel signals at the signal level of the respective columns are sequentially read. In this operation, it is unnecessary to control the transfer transistor Tx for each column. Accordingly, in the imaging device 1a of the present embodiment, a control transistor for controlling the transfer transistor Tx for each column is unnecessary, and the imaging device 1a may be miniaturized as compared to the imaging device 1001b shown in FIG. 17.

As described above, according to the present embodiment, since the capacitive element for holding the pixel signal is unnecessary and the number of transistors in the pixel can be reduced, it may further miniaturize the imaging device. Further, as the output unit 7 that converts the pixel signal input as the current signal into the voltage signal is provided, matching with the circuit of the subsequent stage is facilitated, and since a constant current source provided in the column part may be unnecessary, it may further miniaturize the imaging device.

(Second Embodiment)

Figure 4:
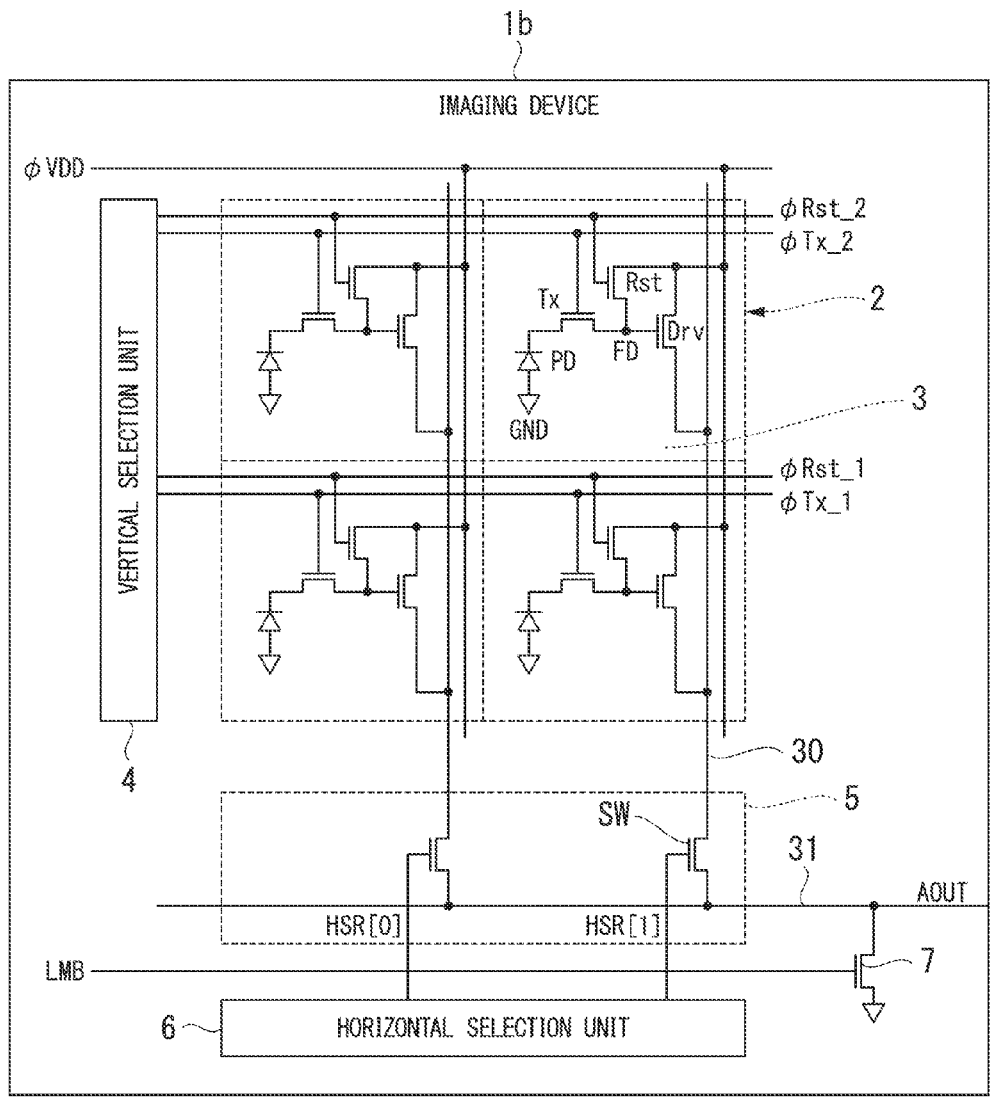
FIG. 4 is a configuration diagram showing a configuration of an imaging device according to a second embodiment of the present invention.

Next, a second embodiment of the present invention will be described. FIG. 4 shows a configuration of the imaging device according to the present embodiment. Hereinafter, a configuration of the present example will be described. The imaging device 1b shown in FIG. 4 differs from the imaging device 1a of the first embodiment in the imaging unit 2. Specifically, the selection transistor Sel of the pixel 3 in the imaging unit 2 is removed, and the power supply voltage VDD is clock-operated by a power supply pulse φVDD. Since the other configurations are substantially the same as those in the first embodiment, a description thereof will be omitted.

Figure 5:
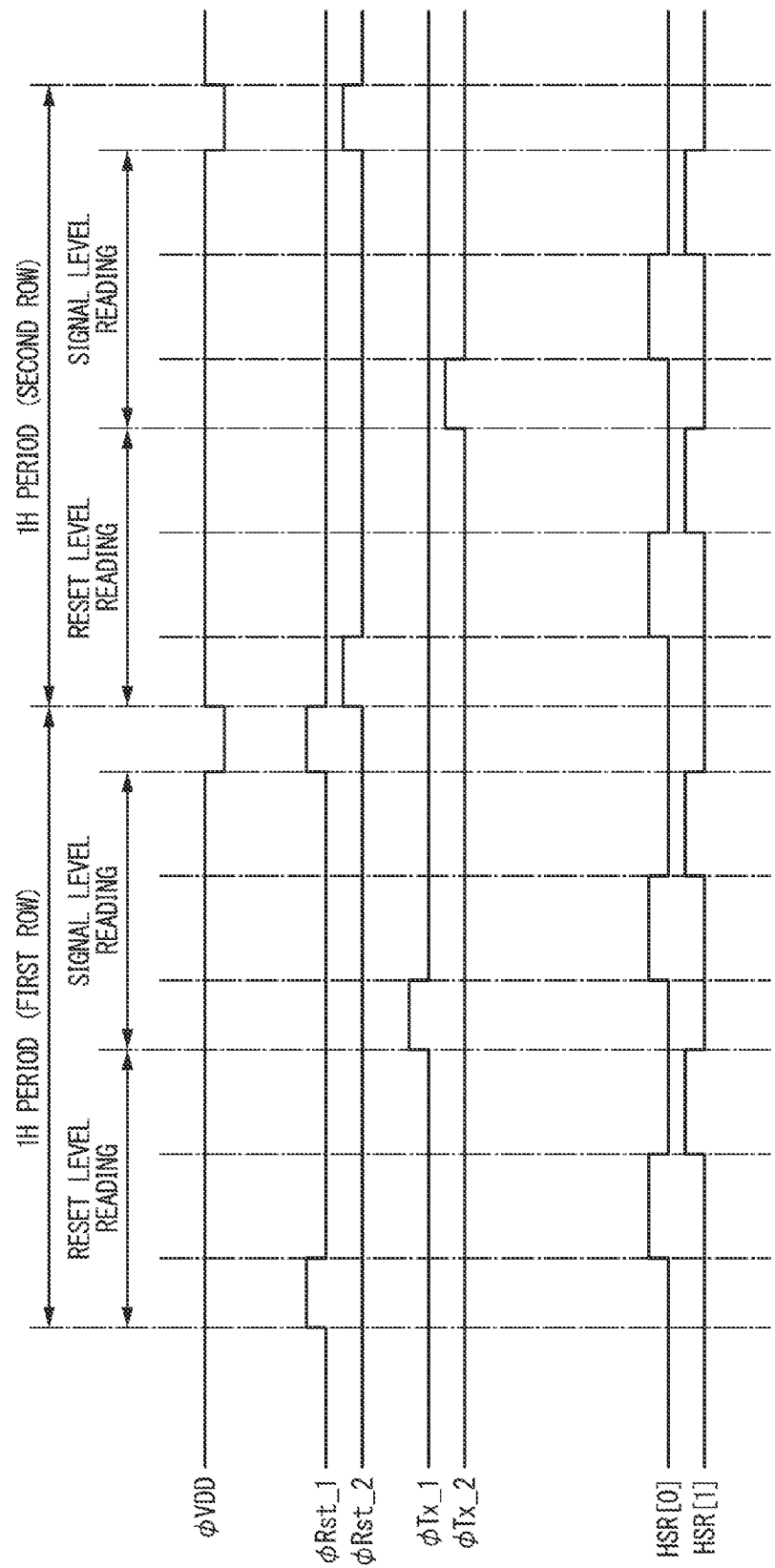
FIG. 5 is a timing chart showing an operation of the imaging device according to the second embodiment of the present invention.

Next, an operation of the imaging device according to the present embodiment will be described. FIG. 5 shows an operation of the imaging device according to the present embodiment. This operation differs from the operation shown in FIG. 2 in that the selection operation by the selection transistor Sel is substituted with a clock operation by the power supply pulse φVDD. A non-selection operation of the pixel 3 is realized by changing the power supply pulse φVDD into an L state (e.g., a ground level), turning ON the reset transistor Rst, and changing a potential of the charge accumulation unit FD into a ground level. Further, the selection operation of the pixel 3 is realized by changing the power supply pulse φVDD into a high state and turning On the reset transistor Rst.

More specifically, when the power supply pulse φVDD is in an H state in a period of time in which the pixel signal is read from the pixel 3 of the first row and as the reset pulse φRst_1 output to the pixel 3 of the first row is changed from being in the L state to being in the H state, the reset transistor Rst is turned ON and the pixel 3 of the first row enters a selection state. Further, accordingly, the charge accumulation unit FD is reset and the pixel signal at the reset level is output to the vertical signal line 30.

After the pixel signal at the reset level and the pixel signal at the signal level are read from the pixel 3 of the first row, the power supply pulse φVDD is changed from being in the H state to being in the L state, as in the first embodiment. At substantially the same time, as the reset pulse φRst_1 is changed from being in the L state to being in the H state, the reset transistor Rst is turned ON and the pixel 3 of the first row is in a non-selection state.

Then, the power supply pulse φVDD is changed from being in the L state to being in the H state, and the reset pulse φRst_1 is changed from being in the H state to being in the L state. At substantially the same time, as the reset pulse φRst_2 output to the pixel 3 of the second row is changed from being in the L state to being in the H state, the reset transistor Rst is turned ON and the pixel 3 of the second row enters a selection state. Accordingly, the charge accumulation unit FD is reset and the pixel signal at the reset level is output to the vertical signal line 30.

After the pixel signal at the reset level and the pixel signal at the signal level are read from the pixel 3 of the second row, the power supply pulse φVDD is changed from being in the H state to being in the L state, as in the first embodiment. At substantially the same time, as the reset pulse φRst_2 is changed from being in the L state to being in the H state, the reset transistor Rst is turned ON and the pixel 3 of the second row is in a non-selection state. Lastly, the circuit of the subsequent stage acquires a signal component (a signal corresponding to a difference between the reset level and the signal level) by performing subtraction (a CDS process).

Figure 6:
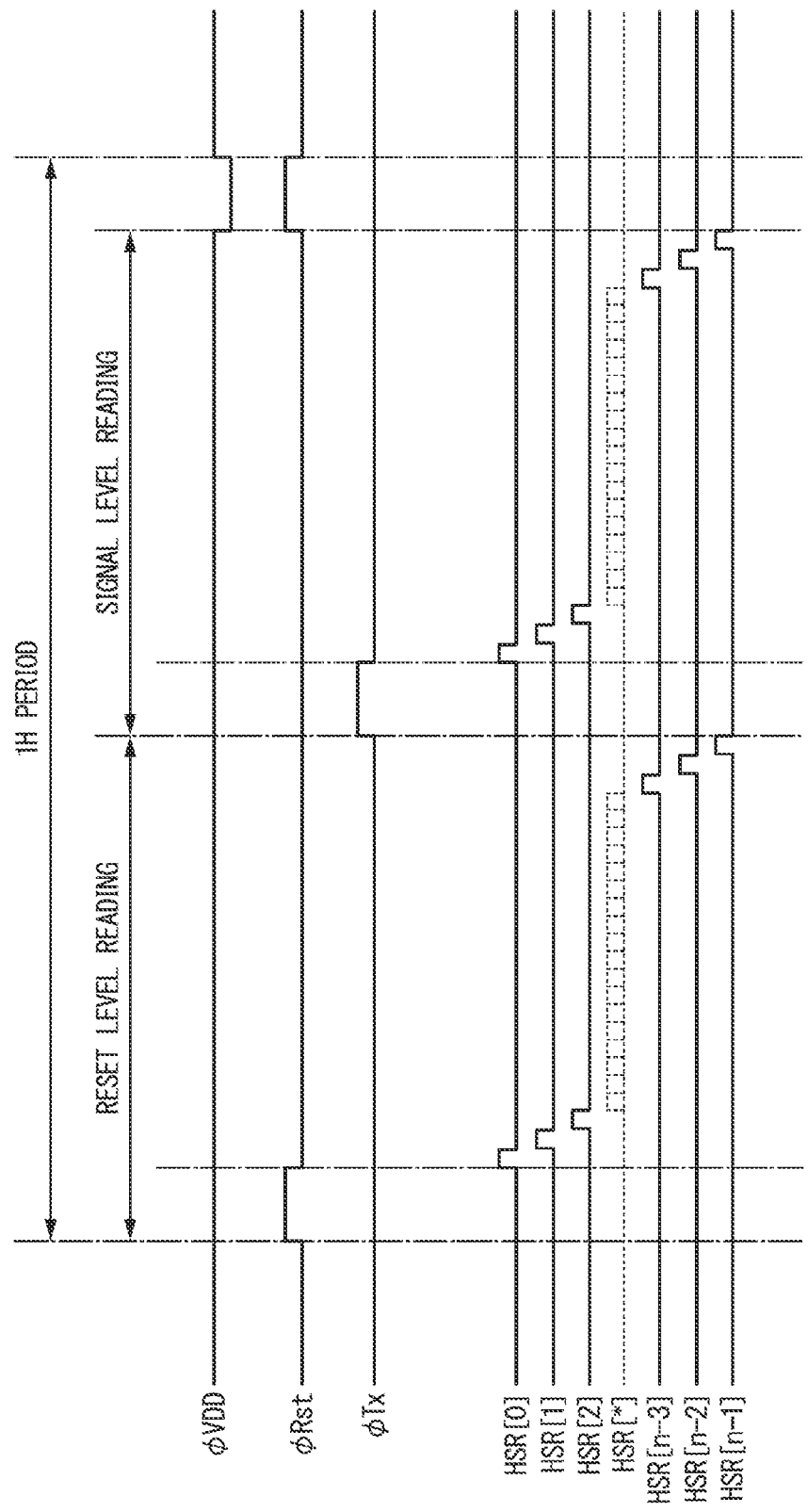
FIG. 6 is a timing chart showing an operation of the imaging device according to the second embodiment of the present invention.

While in the imaging device 1b shown in FIG. 4, a total of four, 2×2, pixels 3 are arranged, the number of pixels 3 is not limited thereto. FIG. 6 shows an operation of the imaging device when an arrangement of the pixels 3 is an n×n (n is a natural number greater than or equal to 3) arrangement that is more general. In FIG. 6, only an operation of reading the pixel signal from the pixels 3 corresponding to one row is shown. Hereinafter, an operation of the imaging device including pixels 3 having a more general arrangement will be described.

As the reset pulse φRst_output to the pixel 3 of a predetermined row is changed from being in the L state to being in the H state when the power supply pulse φVDD is in the H state, the reset transistor Rst is turned ON, the pixel 3 of the predetermined row is selected, and the charge accumulation unit FD is reset. Then, as in the first embodiment, the pixel signals at the reset level of the pixels 3 of each column are sequentially read and then the pixel signals at the signal level of the pixels 3 of each column are sequentially read. The power supply pulse φVDD is then changed from being in the H state to being in the L state. At substantially the same time, as the reset pulse φRst is changed from being in the L state to being in the H state, the reset transistor Rst is turned ON and the pixel 3 of the predetermined row is in a non-selection state. The circuit of the subsequent stage then acquires a signal component (a signal corresponding to a difference between the reset level and the signal level) by performing subtraction (a CDS process).

As described above, according to the present embodiment, since the capacitive element for holding the pixel signal is unnecessary and the number of transistors in the pixel may be reduced, it is possible to further miniaturize the imaging device.

(Third Embodiment)

Next, a third embodiment of the present invention will be described. The imaging device according to the present embodiment differs from the imaging device 1a of the first embodiment in a configuration of the imaging unit 2. Specifically, the third embodiment and the first embodiment differ in the number of unit cell units of the pixel 3 in the imaging unit 2.

Figure 7:
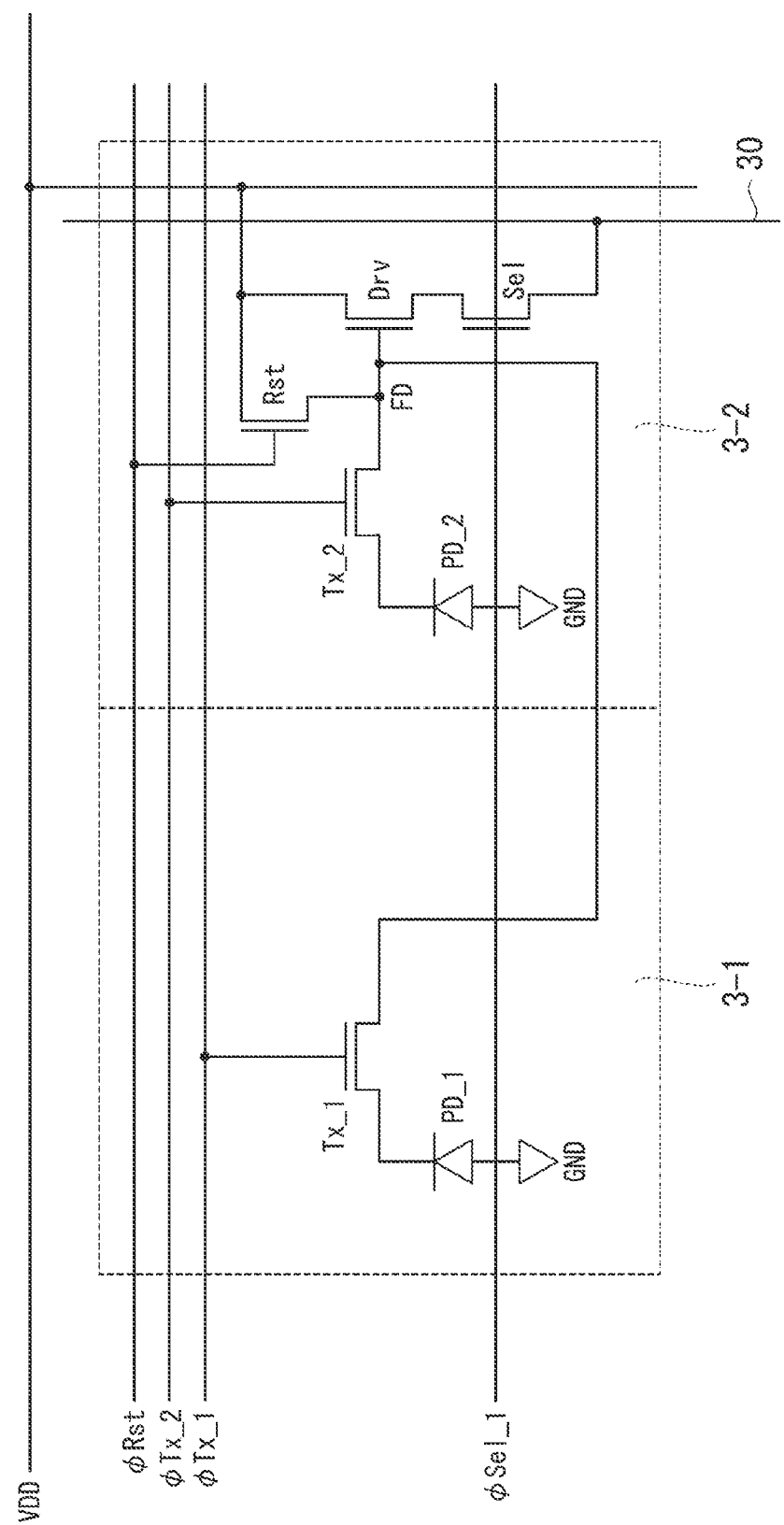
FIG. 7 is a circuit diagram showing a configuration of a pixel included in an imaging device according to a third embodiment of the present invention.

FIG. 7 shows a configuration of the pixel 3 of the present embodiment. In FIG. 7, a configuration of only the pixels 3 of a first row is shown, and a configuration of the pixels 3 of a second row is similar. The pixel 3 is a 2×1 shared pixel. Specifically, the pixel 3 includes two unit cell units (unit cell units 3_1 and 3_2) adjacent in a row direction. Since other parts are substantially similar to those of the pixel 3 in the first embodiment, a description thereof will be omitted. Further, the vertical signal line 30 is arranged only in a second column, and similarly, the switch transistor SW of the switch unit 5 is arranged only in the second column. Since other configurations are substantially the same as those in the first embodiment, a description thereof will be omitted.

The unit cell unit 3-1 includes a charge generation unit PD_1 and a transfer transistor Tx_1. The unit cell unit 3-2 includes a charge generation unit PD_2, a transfer transistor Tx_2, a charge accumulation unit FD, a reset transistor Rst, an amplification transistor Drv, and a selection transistor Sel. The charge accumulation unit FD, the reset transistor Rst, the amplification transistor Drv, and the selection transistor Sel are used in common when a pixel signal is read from the unit cell unit 3-1 and when a pixel signal is read from the unit cell unit 3-2. Further, the transfer transistor Tx_1 is controlled by a transfer pulse φTx_1 output from the vertical selection unit 4, and the transfer transistor Tx_2 is controlled by a transfer pulse φTx_2 output from the vertical selection unit 4.

Figure 8:
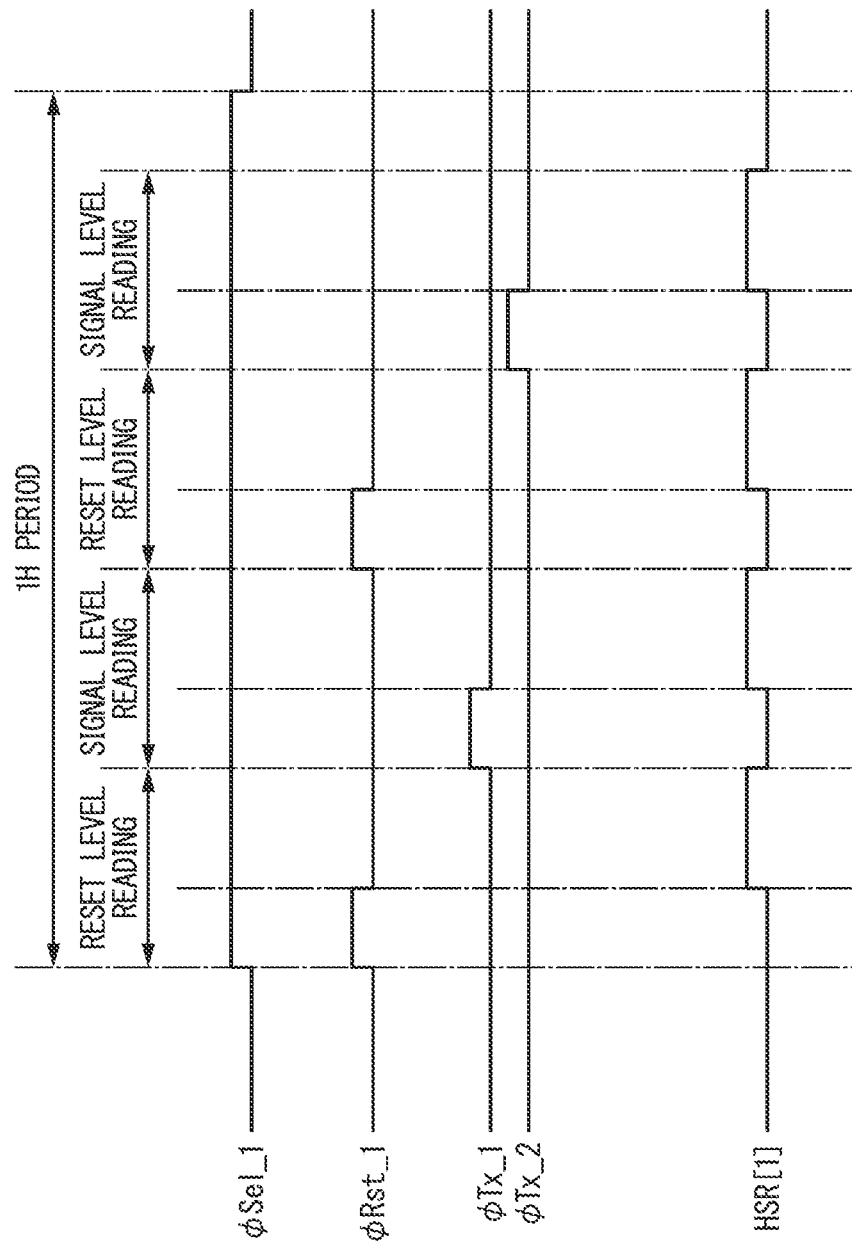
FIG. 8 is a timing chart showing an operation of the imaging device according to the third embodiment of the present invention.

Next, an operation of the imaging device according to the present embodiment will be described. FIG. 8 shows an operation of the imaging device according to the present embodiment. In FIG. 8, only an operation of the pixels 3 of the first row is shown.

After a pixel signal at a reset level and a pixel signal at a signal level of one of the unit cell unit 3-1 and the unit cell unit 3-2 are read, a pixel signal at the reset level and a pixel signal at the signal level of the other of the unit cell unit 3-1 and the unit cell unit 3-2 are read. A concrete operation is as follows.

First, as the selection pulse φSel_1 output to the pixel 3 of the first row is changed from being in the L state to being in the H state, the selection transistor Sel is turned ON and the pixel 3 (the unit cell units 3-1 and 3-2) of the first row is selected. At substantially the same time, as the reset pulse φRst_1 output to the pixel 3 (the unit cell units 3-1 and 3-2) of the first row is changed from being in the L state to being in the H state, the reset transistor Rst is turned ON, the charge accumulation unit FD is reset, and the pixel signal at the reset level is output to the vertical signal line 30.

Then, as the reset pulse φRst_1 is changed from being in the H state to being in the L state, the reset transistor Rst is turned OFF. At substantially the same time, as the selection pulse HSR[1] output to the switch transistor SW of the second column is changed from being in the L state to being in the H state, the switch transistor SW is turned ON and the pixel signal at the reset level output to the vertical signal line 30 is output to the horizontal signal line 31 and input to the output unit 7. The output unit 7 converts the pixel signal at the reset level input as a current signal into a voltage signal, and outputs the voltage signal to a circuit of a subsequent stage. This pixel signal is used as the pixel signal at the reset level corresponding to the unit cell unit 3-1 of the first row.

Then, as the selection pulse HSR[1] is changed from being in the H state to being in the L state, the switch transistor SW is turned OFF. At substantially the same time, as the transfer pulse φTx_1 output to the transfer transistor Tx_1 of the unit cell unit 3-1 of the first row is changed from being in the L state to being in the H state, the transfer transistor Tx_1 is turned ON, signal charges of the charge generation unit PD_1 are transferred to the charge accumulation unit FD, and the pixel signal at the signal level is output to the vertical signal line 30.

Then, as the transfer pulse φTx_1 is changed from being in the H state to being in the L state, the transfer transistor Tx_1 is turned OFF. At substantially the same time, as the selection pulse HSR[1] output to the switch transistor SW of the second column is changed from being in the L state to being in the H state, the switch transistor SW is turned ON, and the pixel signal at the signal level of the unit cell unit 3-1 output to the vertical signal line 30 is output to the horizontal signal line 31 and input to the output unit 7. The output unit 7 converts the pixel signal at the signal level input as a current signal to a voltage signal and outputs the voltage signal to the circuit of the subsequent stage.

Then, as the selection pulse HSR[1] is changed from being in the H state to being in the L state, the switch transistor SW is turned OFF and the operation of reading the pixel signal from the unit cell unit 3-1 ends. Then, the circuit of the subsequent stage acquires a signal component (a signal corresponding to a difference between the reset level and the signal level) for the unit cell unit 3-1 by performing subtraction (a CDS process).

Then, the operation of reading the pixel signal from the unit cell unit 3-2 is then performed. Since the operation of reading the pixel signal from the unit cell unit 3-2 is similar to the operation of reading the pixel signal from the unit cell unit 3-1 except that the signal charges are transferred from the charge generation unit PD_2 to the charge accumulation unit FD by the transfer pulse φTx_2 instead of the transfer pulse φTx_1, a description thereof will be omitted.

Figure 9:
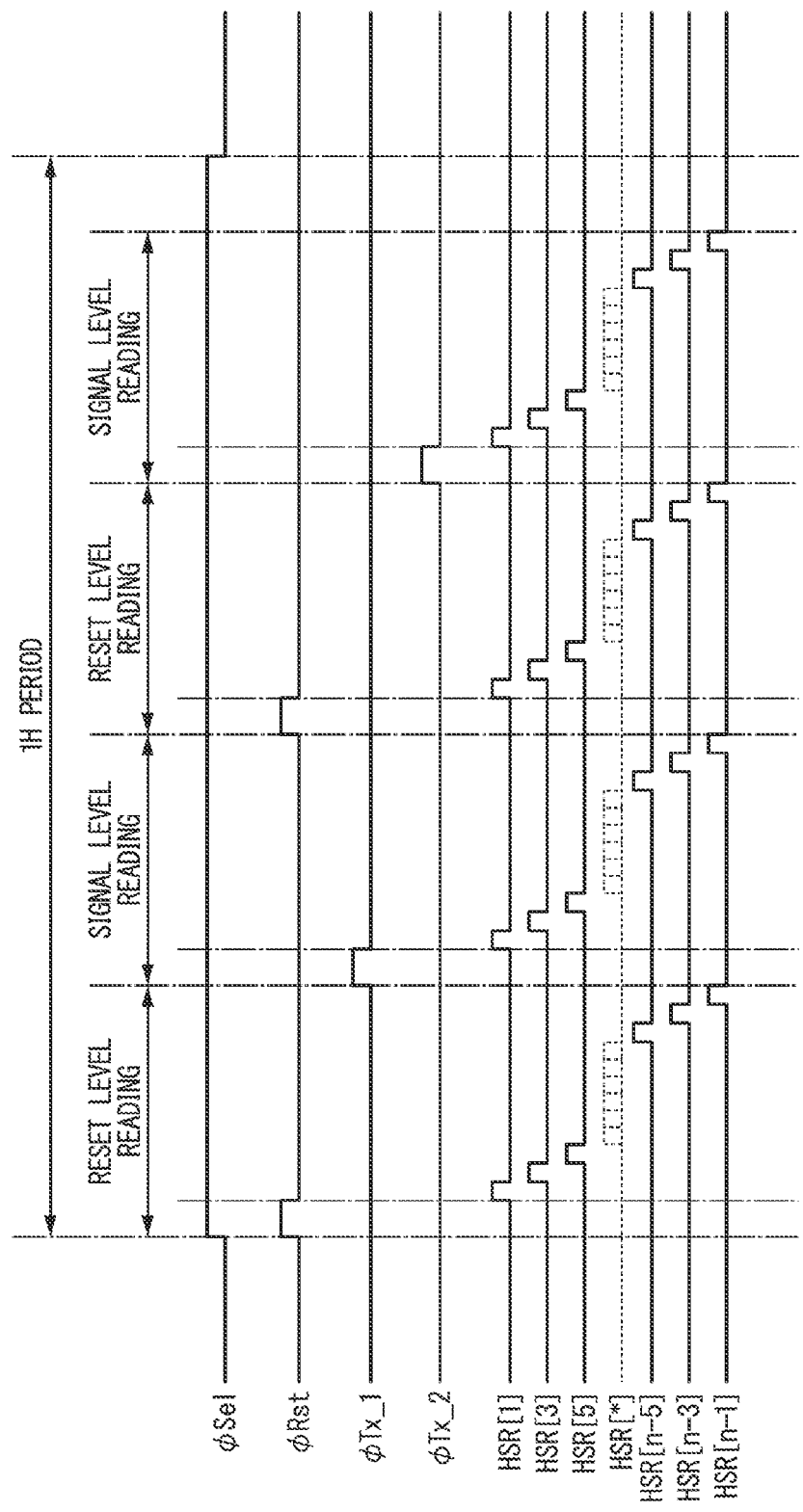
FIG. 9 is a timing chart showing an operation of the imaging device according to the third embodiment of the present invention.

While FIG. 7 shows the configuration of the shared pixel when a total of four, 2×2, pixels 3 are arranged, the number of pixels 3 is not limited thereto. FIG. 9 shows an operation of the imaging device when an arrangement of the pixels 3 is an n×n (n is a natural number greater than or equal to 3) arrangement that is more general, and the shared pixel includes a 2×1 pixel 3. In FIG. 9, only the operation of reading the pixel signal from the pixel 3 corresponding to one row is shown. Hereinafter, an operation of the imaging device including pixels 3 having a more general arrangement will be described. Further, a plurality of 2×1 shared pixels are arranged in a row direction of the imaging unit 2.

After a pixel signal at a reset level and a pixel signal at a signal level of one of a unit cell unit 3-1 and a unit cell unit 3-2 in each shared pixel of a predetermined row are read, a pixel signal at the reset level and a pixel signal at the signal level of the other of the unit cell unit 3-1 and the unit cell unit 3-2 in each shared pixel of a predetermined row are read. A concrete operation is as follows.

The selection transistor Sel is turned ON by the selection pulse φSel_to select the pixel 3 of the predetermined row, and the reset transistor Rst is turned ON by the reset pulse φRst_to reset the charge accumulation unit FD. Then, as selection pulses φHSR[*] (* are 1 to n−1) output to switch transistors SW of the unit cell units 3-2 connected to the vertical signal line 30, which are arranged in every two columns, sequentially change from being in the L state to being in the H state, the switch transistors SW are sequentially turned ON. Accordingly, the pixel signals at the reset level output to the vertical signal lines 30 are sequentially output to the horizontal signal line 31 and input to the output unit 7. The output unit 7 converts the pixel signal at the reset level input as a current signal into a voltage signal, and outputs the voltage signal to a circuit of a subsequent stage. This pixel signal is used as the pixel signal at the reset level corresponding to the unit cell unit 3-1.

Then, the transfer transistor Tx_1 is turned ON by the transfer pulse φTx_1, the signal charges of the charge generation unit PD_1 are transferred to the charge accumulation unit FD, and the pixel signal at the signal level is output to the vertical signal line 30. Then, as the selection pulses φHSR[*] (* is 1 to n−1) output to the switch transistors SW of the unit cell units 3-2 connected to the vertical signal line 30, which are arranged in every two columns, sequentially change from being in the L state to being in the H state, the switch transistors SW are sequentially turned ON. Accordingly, the pixel signals at the signal level of the unit cell units 3-1 output to the vertical signal line 30 are sequentially output to the horizontal signal line 31 and input to the output unit 7. The output unit 7 converts the pixel signal at the signal level of the unit cell unit 3-1 input as a current signal into a voltage signal, and outputs the voltage signal to the circuit of the subsequent stage. The circuit of the subsequent stage then acquires a signal component (a signal corresponding to a difference between the reset level and the signal level) for the cell unit 3-1 by performing subtraction (a CDS process).

An operation of reading the pixel signal from the unit cell unit 3-2 is then performed. Since the operation of reading the pixel signal from the unit cell unit 3-2 is similar to the operation of reading the pixel signal from the unit cell unit 3-1 except that the signal charges are transferred from the charge generation unit PD_2 to the charge accumulation unit FD by the transfer pulse φTx_2 instead of the transfer pulse φTx_1, a description thereof will be omitted.

As described above, according to the present embodiment, since the capacitive element for holding the pixel signal is unnecessary and the number of transistors in the pixel may be reduced, it may further miniaturize the imaging device including an imaging unit having a shared pixel configuration.

(Fourth Embodiment)

Figure 10:
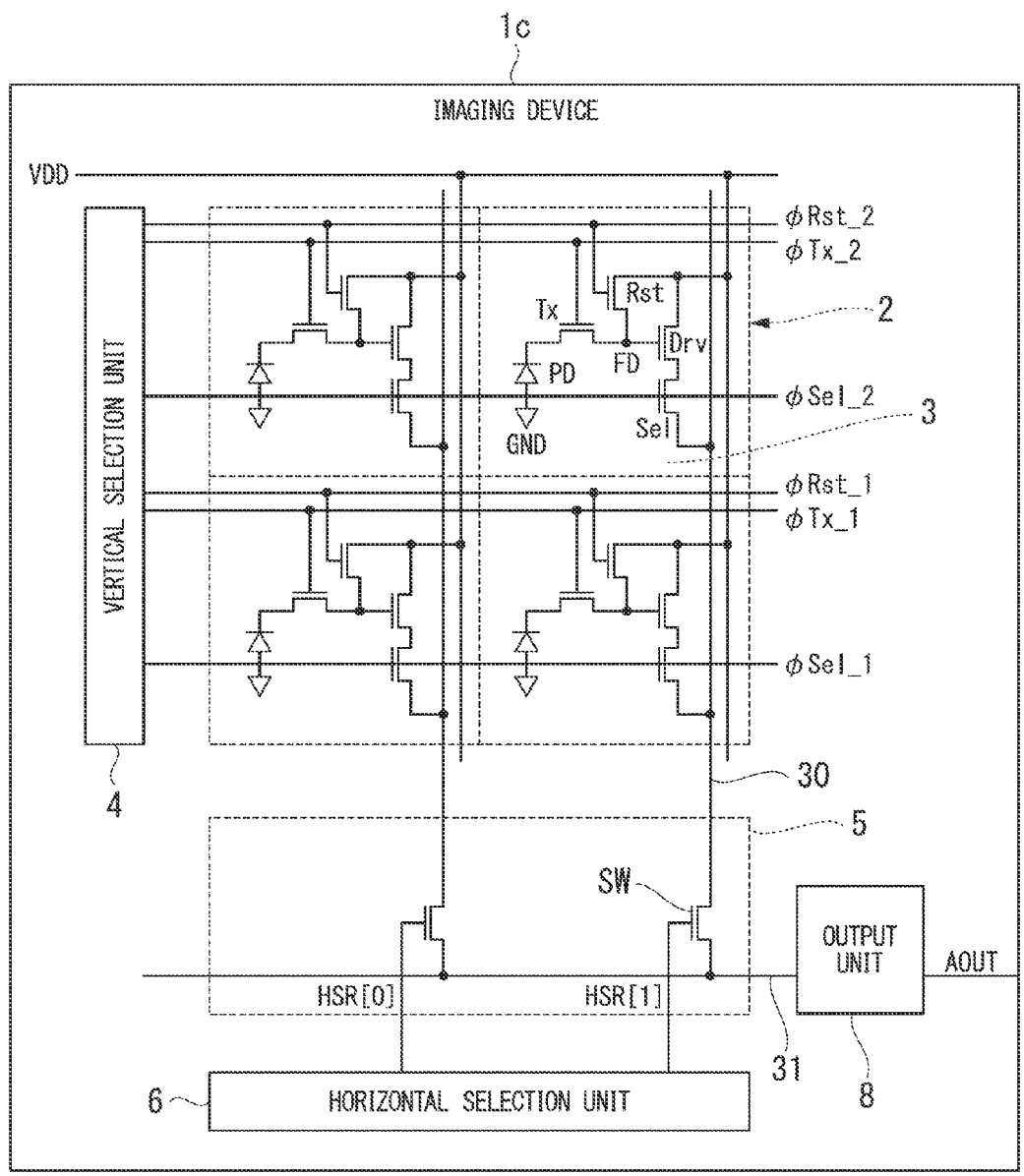
FIG. 10 is a configuration diagram showing a configuration of an imaging device according to a fourth embodiment of the present invention.

Next, a fourth embodiment of the present invention will be described. FIG. 10 shows a configuration of an imaging device according to the present embodiment. Hereinafter, a configuration of the present example will be described. The imaging device 1c shown in FIG. 10 differs from the imaging device 1a of the first embodiment in that an output unit 8 is arranged in place of the output unit 7. Since other configurations are substantially the same as those in the first embodiment, a description thereof will be omitted.

Figure 11:
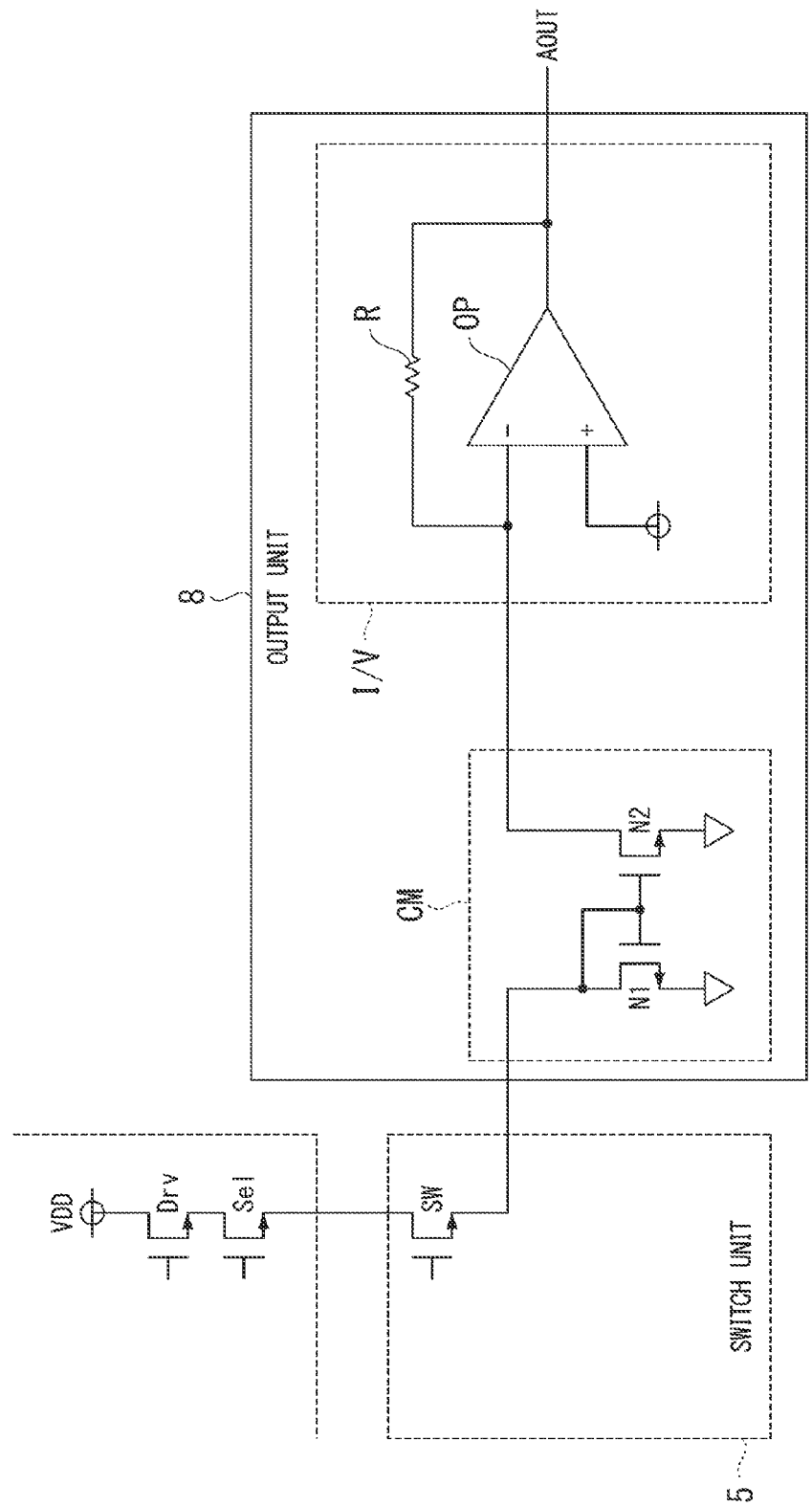
FIG. 11 is a circuit diagram showing a configuration of an output unit included in the imaging device according to the fourth embodiment of the present invention.

FIG. 11 shows a configuration of the output unit 8. The output unit 8 includes a current mirror unit CM and an amplification unit IN. The current mirror unit CM includes NMOS transistors N1 and N2. The NMOS transistor N1 has a drain terminal connected to the source terminal of the switch transistor SW in the switch unit 5, a source terminal connected to ground, and a gate terminal connected to the drain terminal. The NMOS transistor N2 has a drain terminal connected to the amplification unit IN, a source terminal connected to the ground, and a gate terminal connected to the gate terminal of the NMOS transistor N1.

The amplification unit I/V is a current-voltage conversion amplifier for converting a current signal into a voltage signal and outputting the voltage signal, and includes a resistor R and an operational amplifier OP.

The current mirror unit CM reiterates the pixel signal input as a current signal, and outputs a resultant pixel signal to the amplification unit I/V. A ratio of a current flowing in the NMOS transistor N1 and a current flowing in the NMOS transistor N2 may be adjusted to be any ratio. The amplification unit I/V converts the reiterated pixel signal into a voltage signal and outputs the voltage signal to the circuit of the subsequent stage. Use of the current mirror configuration enables a current value to be easily amplified.

As described above, according to the present embodiment, it may further miniaturize the imaging device and to amplify the current value of the pixel signal with a simple circuit configuration.

(Fifth Embodiment)

Figure 12:
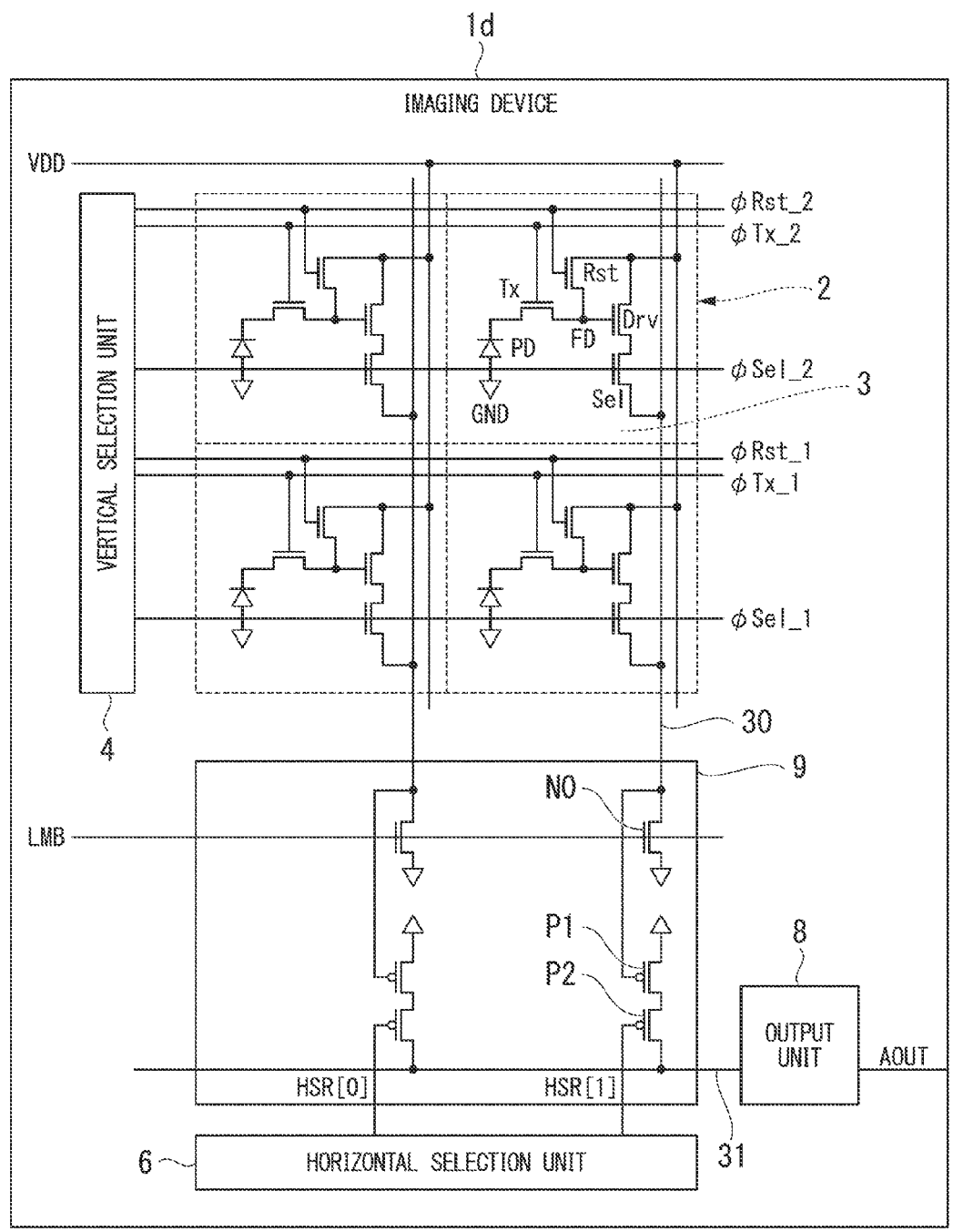
FIG. 12 is a configuration diagram showing a configuration of an imaging device according to a fifth embodiment of the present invention.

Next, a fifth embodiment of the present invention will be described. FIG. 12 shows a configuration of an imaging device according to the present embodiment. Hereinafter, a configuration of the present example will be described. The imaging device 1d shown in FIG. 12 differs from the imaging device 1c of the fourth embodiment in that a column circuit unit 9 is arranged instead of the switch unit 5. Since the other configurations are substantially the same as those in the first embodiment, a description thereof will be omitted.

The column circuit unit 9 includes an NMOS transistor N0 and PMOS transistors P1 and P2. The NMOS transistor N0 has a drain terminal connected to a vertical signal line 30, a source terminal connected to ground, and a gate terminal connected to a bias voltage LMB. The PMOS transistor P1 has a drain terminal connected to the ground, a source terminal connected to a drain terminal of the PMOS transistor P2, and a gate terminal connected to a drain terminal of the NMOS transistor N0. The PMOS transistor P2 has a drain terminal connected to the source terminal of PMOS transistor P1, a source terminal connected to a horizontal signal line 31, and a gate terminal connected to a horizontal selection unit 6.

The PMOS transistor P2 is controlled by selection pulses HSR[0] and HSR[1] output from the horizontal selection unit 6. The selection pulses HSR[0] and HSR[1] output from the horizontal selection unit 6 to the PMOS transistor P2 are pulses obtained by changing the H state of the selection pulses HSR[0] and HSR[1] shown in FIG. 2 into the L state and changing the L state into the H state.

As described above, according to the present embodiment, it may further miniaturize the imaging device. Further, the current value may be easily amplified and the pixel signal can be transferred to the output unit 8 by adjusting sizes of the PMOS transistors P1 and P2.

(Sixth Embodiment)

Figure 13:
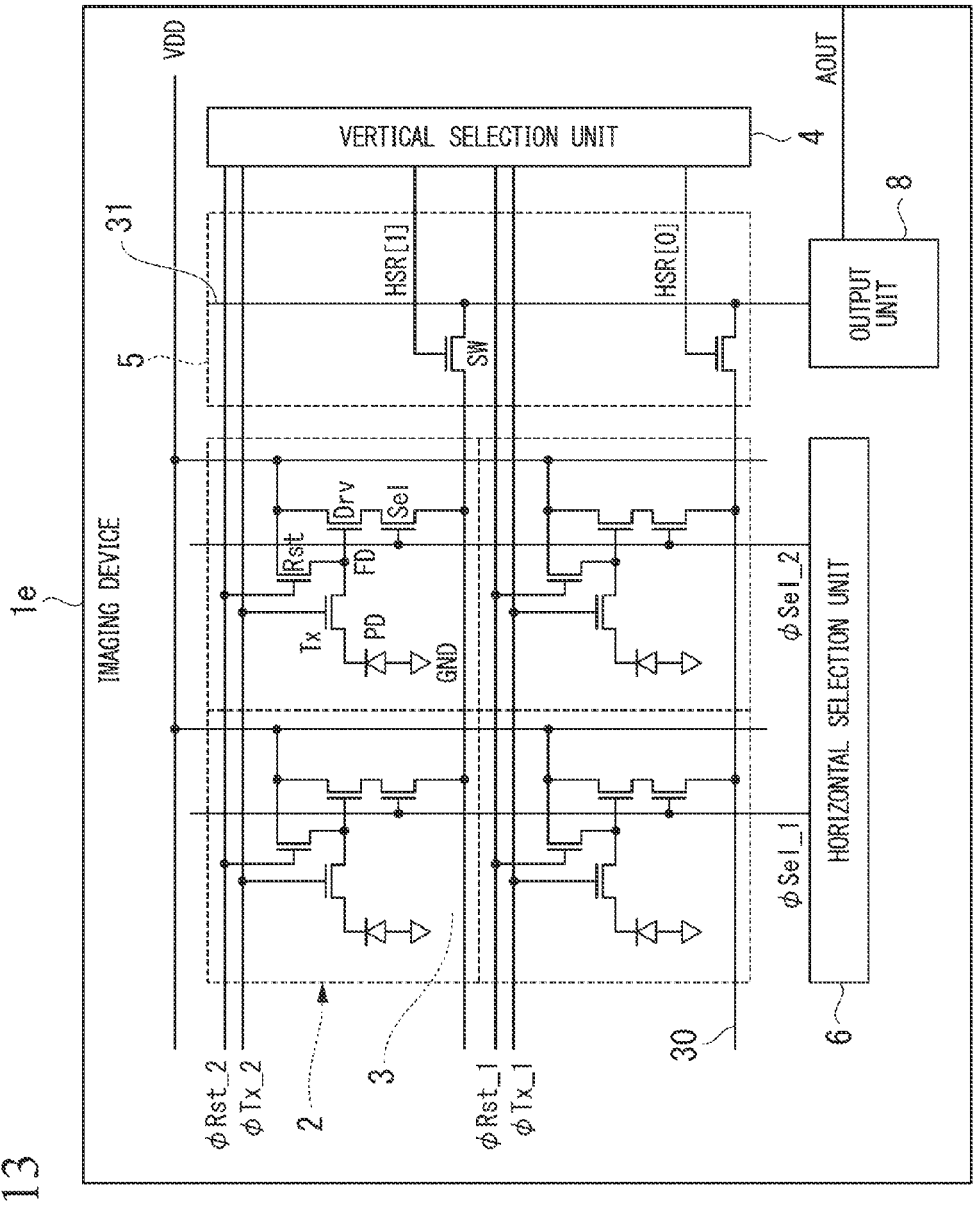
FIG. 13 is a configuration diagram showing a configuration of an imaging device according to a sixth embodiment of the present invention.

Next, a sixth embodiment of the present invention will be described. FIG. 13 shows a configuration of an imaging device according to the present embodiment. Hereinafter, a configuration of the present example will be described. The imaging device 1e shown in FIG. 13 differs from the imaging device 1c of the fourth embodiment in a configuration of the pixel 3.

The gate terminal of the selection transistor Sel is connected to the horizontal selection unit 6, and the selection transistor Sel is controlled by the selection pulse output from the horizontal selection unit 6. In FIG. 13, it is assumed that a selection pulse output to the selection transistor Sel of the pixel 3 of the first column is φSel_1, and a selection pulse output to the selection transistor Sel of the pixel 3 of the second column is φSel_2. The vertical signal line 30 is arranged horizontally, and the pixel signal output from the pixel 3 is output horizontally.

As the vertical signal line 30 is arranged horizontally, the horizontal signal line 31 is arranged vertically. A gate terminal of the switch transistor SW in the switch unit 5 is connected to the vertical selection unit 4, and the switch transistor SW is controlled by the selection pulse output from the vertical selection unit 4. In FIG. 13, it is assumed that a selection pulse output to the switch transistor SW of the first row is HSR[0] and a selection pulse output to the switch transistor SW of the second row is HSR[1]. Since other configurations are substantially the same as those in the first embodiment, a description thereof will be omitted.

In an operation of the imaging device 1e according to the present embodiment, waveforms of the selection pulse φSel_1 and the selection pulse HSR[0] are replaced in FIG. 2, which shows the operation of the imaging device 1a according to the first embodiment, and waveforms of the selection pulse φSel_2 and the selection pulse HSR[1] are replaced in FIG. 2. In other words, in the present embodiment, the reset transistor Rst is turned ON by the reset pulse φRst_1 in a state in which the switch transistor SW is turned ON by the selection pulse HSR[0] of the first row, and the charge accumulation unit FD is reset. Then, the selection transistors Sel of the first column and the second column are sequentially turned ON by the selection pulses φSel_1 and φSel_2, and the pixel signal at the reset level of each column is read. Then, the transfer transistor Tx is turned ON by the transfer pulse φTX_1, and signal charges of the charge generation unit PD are transferred to the charge accumulation unit FD. Then, the selection transistors Sel of the first column and the second column are sequentially turned ON by the selection pulses φSel_1 and φSel_2, and the pixel signal at the signal level of each column is read. Then, the pixel signal of the second row is read, as in the above description, in a state in which the switch transistor SW is turned ON by the selection pulse HSR[1] of the second row.

In the operation of the imaging device 1a shown in FIG. 2, each of the number of times one switch transistor SW is changed from OFF to ON and the number of times the switch transistor SW is changed from ON to OFF is 2 in a period of time in which the pixel signal is read from the pixel 3 of one row. On the other hand, in the operation of the imaging device 1e of the present embodiment, each of the number of times one switch transistor SW is changed from OFF to ON and the number of times one switch transistor SW is changed from ON to OFF is 1 in a period of time in which the pixel signal is read from the pixel 3 of one row. In other words, the number of times a parasitic capacitance connected to the vertical signal line 30 is charged and discharged in the present embodiment is smaller than that in the first embodiment. As the number of times the parasitic capacitance connected to the vertical signal line 30 is charged and discharged is reduced, it may realize the imaging device with high speed and low power consumption.

As described above, according to the present embodiment, it may further miniaturize the imaging device. Further, as the vertical signal line is arranged horizontally and the horizontal signal line is arranged vertically, it may improve the degree of freedom of layout. Further, since a charging and discharging operation of the parasitic capacitance of the vertical signal line may be reduced, it may realize the imaging device with high speed and low power consumption.

(Seventh Embodiment)

Figure 14:
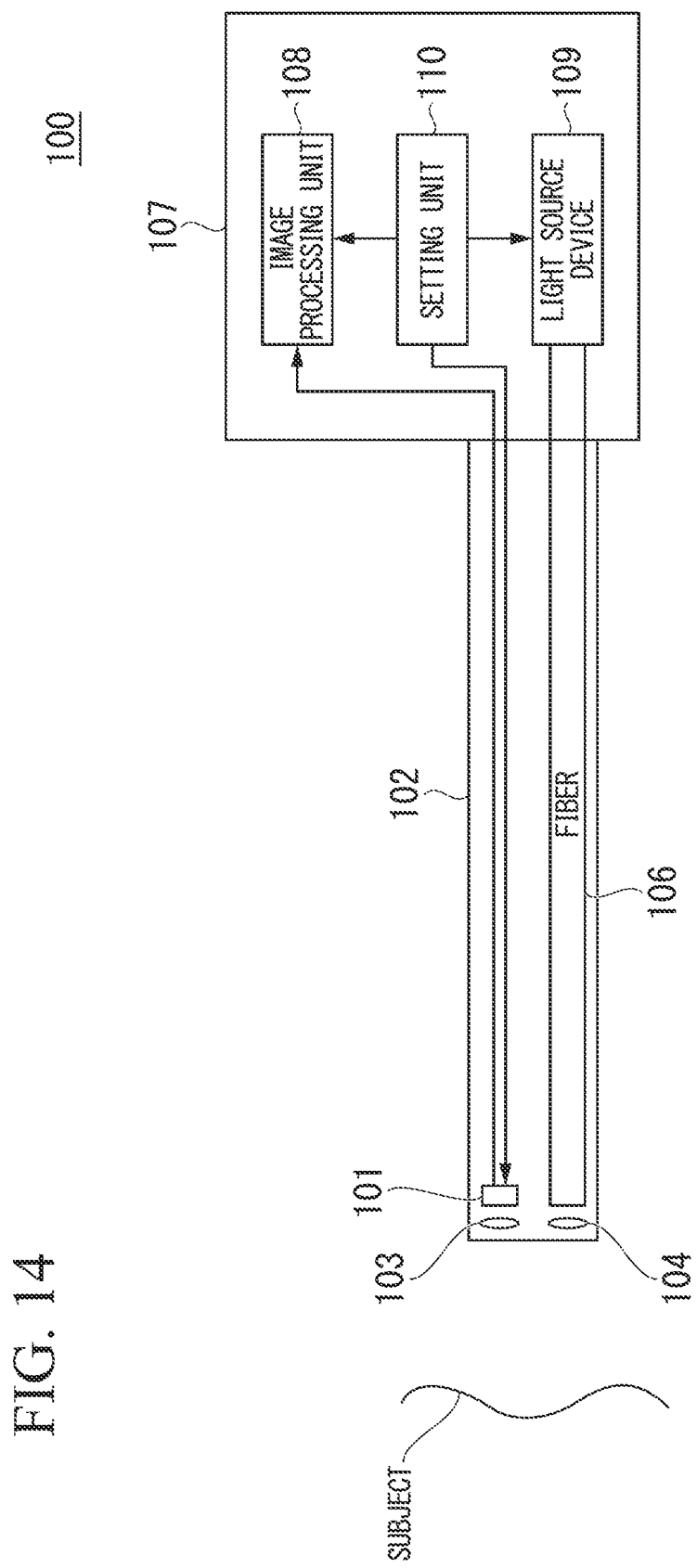
FIG. 14 is a configuration diagram showing a configuration of an endoscopic device according to a seventh embodiment of the present invention.

Next, a seventh embodiment of the present invention will be described. FIG. 14 shows a configuration of an endoscopic device according to the present embodiment. Hereinafter, a configuration of the present example will be described.

An endoscopic device 100 as shown FIG. 14 includes a scope 102 and a housing 107. Further, the scope 102 includes an imaging device 101 that is an application example of the present invention, a lens 103 that images a reflected light from a subject to the imaging device 101, a fiber 106 that passes an illumination light to the subject, and a lens 104 that irradiates the illumination light to the subject. Further, the housing 107 includes a light source device 109 including a light source that generates the illumination light to be irradiated to the subject, an image processing unit 108 that performs a predetermined process on a signal output from the imaging device 101 to generate a captured image, and a setting unit 110 that sets a capturing (observation) mode of the endoscopic device. As the imaging device 101, for example, the imaging device of the third embodiment is used.

As described above, according to the present embodiment, it may reduce a diameter of the scope of the endoscopic device using the miniaturized imaging device.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An imaging device comprising:
an imaging unit in which a plurality of pixels is arranged in a matrix shape, each of the pixels including at least one unit cell unit including a charge generation unit for generating signal charges corresponding to an amount of an incident electromagnetic wave and a charge transfer unit for transferring the signal charges generated by the charge generation unit, a charge accumulation unit for accumulating the signal charges transferred by the charge transfer unit, a reset unit for resetting the charge accumulation unit, and a signal generation unit for generating a pixel signal corresponding to a voltage of the charge accumulation unit;
a first selection unit for selecting a plurality of pixels arranged in a row direction of the imaging unit and controlling an operation of the plurality of selected pixels;
a second selection unit for sequentially selecting a plurality of the pixel signals output from the plurality of selected pixels selected by the first selection unit; and
an output unit for outputting an input signal to a circuit of a subsequent stage,
wherein, in the plurality of pixels arranged in the row direction,
the first selection unit simultaneously resets the charge accumulation units of the plurality of pixels, and then the second selection unit sequentially selects a plurality of first pixel signals corresponding to voltages of the charge accumulation units of the plurality of pixels and inputs the first pixel signals to the output unit, and
the first selection unit simultaneously transfers the signal charges generated by the charge generation units in the plurality of pixels to the charge accumulation units, and then the second selection unit sequentially selects a plurality of second pixel signals corresponding to the voltages of the charge accumulation units of the plurality of pixels and inputs the second pixel signals to the output unit.

2. The imaging device according to claim 1, wherein the first pixel signal and the second pixel signal are output in the row direction of the imaging unit.

3. The imaging device according to claim 1, wherein the output unit converts a current value of an input signal into a voltage value.

4. An endoscopic device comprising an imaging device according to any one of claims 1 to 3.

* * * * *